US009403062B2

(12) United States Patent
Kim et al.

(10) Patent No.: US 9,403,062 B2
(45) Date of Patent: Aug. 2, 2016

(54) PROCESS FOR DESIGNING RUGGED PATTERN ON GOLF BALL SURFACE

(71) Applicant: DUNLOP SPORTS CO. LTD., Kobe-shi, Hyogo (JP)

(72) Inventors: Hyoungchol Kim, Kobe (JP); Masahide Onuki, Kobe (JP); Takahiro Sajima, Kobe (JP); Kohei Mimura, Kobe (JP)

(73) Assignee: DUNLOP SPORTS CO. LTD., Kobe-Shi (JP)

( * ) Notice: Subject to any disclaimer, the term of this patent is extended or adjusted under 35 U.S.C. 154(b) by 218 days.

(21) Appl. No.: 14/072,902

(22) Filed: Nov. 6, 2013

(65) Prior Publication Data
US 2014/0128179 A1 May 8, 2014

(30) Foreign Application Priority Data

| Nov. 7, 2012 | (JP) | 2012-244973 |
| Nov. 12, 2012 | (JP) | 2012-248631 |
| May 9, 2013 | (JP) | 2013-098935 |
| May 9, 2013 | (JP) | 2013-098950 |

(51) Int. Cl.
*A63B 37/14* (2006.01)
*A63B 37/00* (2006.01)
*G06T 17/20* (2006.01)

(52) U.S. Cl.
CPC ........... *A63B 37/0006* (2013.01); *A63B 37/002* (2013.01); *G06T 17/20* (2013.01); *A63B 37/0007* (2013.01); *A63B 37/0018* (2013.01); *A63B 37/0021* (2013.01)

(58) Field of Classification Search
USPC ................................. 473/351–385
See application file for complete search history.

(56) References Cited

U.S. PATENT DOCUMENTS

| 5,292,132 A | 3/1994 | Oka |
| 5,965,235 A * | 10/1999 | McGuire ............... B29C 51/225 156/209 |
| 6,409,615 B1 * | 6/2002 | McGuire ............ A63B 37/0004 473/383 |
| 7,198,577 B2 | 4/2007 | Ogg et al. |
| 7,825,927 B2 | 11/2010 | Kim et al. |

(Continued)

FOREIGN PATENT DOCUMENTS

| JP | 4-347177 A | 12/1992 |
| JP | 2000-185113 A | 7/2000 |

(Continued)

OTHER PUBLICATIONS

Livingston, "Euclidean Voronoi Diagrams for Circles in a Circle", CMPT 463, Apr. 3, 2008, pp. 1-10, XP2720978.

*Primary Examiner* — Alvin Hunter
(74) *Attorney, Agent, or Firm* — Birch, Stewart, Kolasch & Birch, LLP

(57) ABSTRACT

A golf ball has, on a surface thereof, a rugged pattern composed of a land and a large number of dimples. A method for designing the rugged pattern includes the steps of:
(1) assuming a large number of circles on a surface of a phantom sphere;
(2) assuming a large number of generating points 16 based on positions of the large number of circles;
(3) assuming a large number of Voronoi regions 18 on the surface of the phantom sphere by a Voronoi tessellation based on the large number of generating points 16; and
(4) assigning a dimple and a land to the surface of the phantom sphere based on contours of the large number of Voronoi regions 18.

8 Claims, 38 Drawing Sheets

(56) References Cited

U.S. PATENT DOCUMENTS

2004/0058752 A1  3/2004  Kasashima
2013/0005510 A1* 1/2013  Kim .................. G06F 17/50
                                              473/384
2014/0128179 A1* 5/2014  Kim .................. A63B 37/0006
                                              473/383

FOREIGN PATENT DOCUMENTS

| JP | 2004-505735 A | | 2/2004 |
| JP | 2004-113363 A | | 4/2004 |
| JP | 2013009906 A | * | 1/2013 |
| WO | WO 02/13916 A2 | | 2/2002 |

* cited by examiner

PROCESS FOR DESIGNING RUGGED PATTERN ON GOLF BALL SURFACE

This application claims priority on Patent Application No. 2012-244973 filed in JAPAN on Nov. 7, 2012, Patent Application No. 2012-248631 filed in JAPAN on Nov. 12, 2012, Patent Application No. 2013-98935 filed in JAPAN on May 9, 2013, and Patent Application No. 2013-98950 filed in JAPAN on May 9, 2013. The entire contents of these Japanese Patent Applications are hereby incorporated by reference.

BACKGROUND OF THE INVENTION

1. Field of the Invention

The present invention relates to golf balls. Specifically, the present invention relates to processes for designing a rugged pattern on a golf ball surface.

2. Description of the Related Art

Golf balls have a large number of dimples on the surface thereof. The dimples disturb the air flow around the golf ball during flight to cause turbulent flow separation. By causing the turbulent flow separation, separation points of the air from the golf ball shift backwards leading to a reduction of drag. The turbulent flow separation promotes the displacement between the separation point on the upper side and the separation point on the lower side of the golf ball, which results from the backspin, thereby enhancing the lift force that acts upon the golf ball. The reduction of drag and the enhancement of lift force are referred to as a "dimple effect".

The ratio of the total area of dimples to the surface area of a phantom sphere of a golf ball is referred to as occupation ratio. It is known that the occupation ratio correlates to flight performance. A golf ball having an increased occupation ratio is disclosed in JP4-347177. The golf ball has circular dimples.

In a golf ball in which a small circular dimple is arranged in a zone surrounded by a plurality of large circular dimples, a high occupation ratio can be achieved. However, the small dimple does not contribute to the flight performance of the golf ball. There is a limit to the dimple effect of the golf ball having the circular dimples.

U.S. Pat. No. 7,198,577 discloses a golf ball having hexagonal dimples. The occupation ratio of the golf ball is high. The golf ball does not have any small dimples. In the golf ball, the dimples are orderly arranged. The dimple effect of the golf ball is insufficient.

The United States Golf Association (USGA) has established the rules about symmetry of golf balls. According to the rules, the trajectory during PH (pole horizontal) rotation and the trajectory during POP (pole over pole) rotation are compared with each other. A golf ball having a large difference between these two trajectories does not conform to the rules. In other words, a golf ball having inferior aerodynamic symmetry does not conform to the rules. A golf ball with inferior aerodynamic symmetry has a short flight distance because the aerodynamic characteristic of the golf ball for PH rotation or for POP rotation is inferior. The rotation axis for PH rotation extends through the poles of the golf ball, and the rotation axis for POP rotation is orthogonal to the rotation axis for PH rotation.

Generally, a golf ball is formed by a mold including upper and lower mold halves. The mold has a parting line. A golf ball obtained by this mold has a seam at a position along the parting line. Through this forming, spew occurs along the seam. The spew is removed by means of cutting. By cutting the spew, the dimples near the seam are deformed. In addition, the dimples near the seam tend to be orderly arranged. The position of the seam coincides with the position of the equator or the seam is located near the equator. The region near the equator is a unique region. The cutting of the spew impairs the aerodynamic symmetry of the golf ball.

The present inventor has proposed a process for designing a rugged pattern using a Voronoi tessellation in Japanese Patent Application No. 2012-244973. In this designing process, a pattern having a high occupation ratio can be obtained. In addition, in this designing process, a pattern having distortional dimples can be obtained. In the pattern having distortional dimples, the dimples are not orderly arranged. The golf ball has excellent flight performance.

In the pattern obtained by the Voronoi tessellation, the effect of deformation of dimples by cutting of spew prominently appears. Specifically, a phenomenon appears that the aerodynamic symmetry is impaired. In addition, when the amount of cutting is varied, a phenomenon also appears that the height of a trajectory during PH rotation is varied considerably. The reason for these phenomena is thought to be that the volumes of the dimples adjacent to the seam are reduced considerably by the cutting.

An object of the present invention is to provide a golf ball having excellent flight performance. Another object of the present invention is to provide a golf ball having excellent aerodynamic symmetry.

SUMMARY OF THE INVENTION

A process for designing a rugged pattern on a golf ball surface according to the present invention includes the steps of:

(1) assuming a large number of circles on a surface of a phantom sphere;

(2) assuming a large number of generating points based on positions of the large number of circles;

(3) assuming a large number of Voronoi regions on the surface of the phantom sphere by a Voronoi tessellation based on the large number of generating points; and (4) assigning a dimple and a land to the surface of the phantom sphere based on contours of the large number of Voronoi regions.

By the designing process, a golf ball having excellent flight performance can easily be obtained.

Preferably, at the step (1), the large number of circles are assumed such that each circle does not intersect another circle adjacent to the circle. Preferably, at the step (1), a large number of circles whose diameters are equal to or greater than 2.0 mm but equal to or less than 6.0 mm are assumed. Preferably, a number of the circles assumed at the step (1) is equal to or greater than 280 but equal to or less than 400. Preferably, a ratio of a total area of the circles assumed at the step (1) relative to an area of the surface of the phantom sphere is equal to or greater than 60%.

Preferably, at the step (2), a center of each circle is assumed as a generating point. At the step (2), a point obtained by projecting a center of each circle onto the surface of the phantom sphere may be assumed as a generating point.

Preferably, the step (3) includes the steps of:

(3.1) assuming a large number of minute cells on the surface of the phantom sphere;

(3.2) selecting a generating point that is closest to each cell;

(3.3) assuming, for each generating point, a set of cells for which said each generating point is a closest generating point; and (3.4) setting each set as a Voronoi region.

A golf ball according to the present invention has a large number of dimples on a surface thereof. These dimples include a dimple having a radius variation range $R_h$ of 0.4 mm or greater. Preferably, a ratio P1 of a number of dimples having a radius variation range Rh of 0.4 mm or greater relative to a total number of the dimples is equal to or greater than 30%.

According to another aspect, a golf ball according to the present invention has a large number of dimples on a surface thereof. These dimples include a dimple that meets the following mathematical formula.

$$Rh/Rave \geq 0.25$$

In the mathematical formula, Rh represents a radius variation range, and Rave represents an average radius.

According to still another aspect, a golf ball according to the present invention has a large number of dimples on a surface thereof. In the golf ball, a difference between a radius variation range Rhmax of a dimple having a maximum radius variation range Rh and a radius variation range Rhmin of a dimple having a minimum radius variation range Rh is equal to or greater than 0.1 mm.

According to still another aspect, a golf ball according to the present invention has a large number of dimples on a surface thereof. The golf ball meets the following mathematical formula.

$$(Rhmax-Rhmin) > (R1-R2)$$

In the mathematical formula, Rhmax represents a radius variation range of a dimple having a maximum radius variation range Rh, Rhmin represents a radius variation range of a dimple having a minimum radius variation range Rh, R1 represents an average radius of the dimple having a maximum radius variation range Rh, and R2 represents an average radius of the dimple having a minimum radius variation range Rh.

According to still another aspect, a golf ball according to the present invention has a large number of dimples on a surface thereof. The golf ball has a dimple having a radius variation range Rh of 0.4 mm or greater in a zone in which a latitude is equal to or greater than −10° but equal to or less than 10°. An area Amax of a dimple having a maximum area A among the dimples present in the zone in which the latitude is equal to or greater than −10° but equal to or less than 10° is equal to or less than 22.0 mm². An average Aave of areas A of the dimples present in the zone in which the latitude is equal to or greater than −10° but equal to or less than 10° is equal to or less than 18.0 mm².

Preferably, a ratio PE1 of a number NE1 of dimples having a radius variation range Rh of 0.4 mm or greater relative to a total number NE of the dimples in the zone in which the latitude is equal to or greater than −10° but equal to or less than 10° is equal to or greater than 30%.

Preferably, the golf ball has a dimple that meets the following mathematical formula (1) in the zone in which the latitude is equal to or greater than −10° but equal to or less than 10°.

$$Rh/Rave \geq 0.25 \tag{1}$$

In the mathematical formula, Rh represents a radius variation range, and Rave represents an average radius. Preferably, a ratio PE2 of a number NE2 of dimples 8 that meet the mathematical formula (1) relative to a total number NE of the dimples in the zone in which the latitude is equal to or greater than −10° but equal to or less than is equal to or greater than 10%.

Preferably, a difference between a radius variation range Rhmax of a dimple having a maximum radius variation range Rh and a radius variation range Rhmin of a dimple having a minimum radius variation range Rh is equal to or greater than 0.1 mm.

Preferably, the golf ball meets the following mathematical formula (2).

$$(Rhmax-Rhmin) > (R1-R2) \tag{2}$$

In the mathematical formula, Rhmax represents a radius variation range of a dimple having a maximum radius variation range Rh, Rhmin represents a radius variation range of a dimple having a minimum radius variation range Rh, R1 represents an average radius of the dimple having a maximum radius variation range Rh, and R2 represents an average radius of the dimple having a minimum radius variation range Rh.

DESCRIPTION OF THE PREFERRED EMBODIMENTS

The following will describe in detail the present invention based on preferred embodiments with reference to the accompanying drawings.

Figure 1:
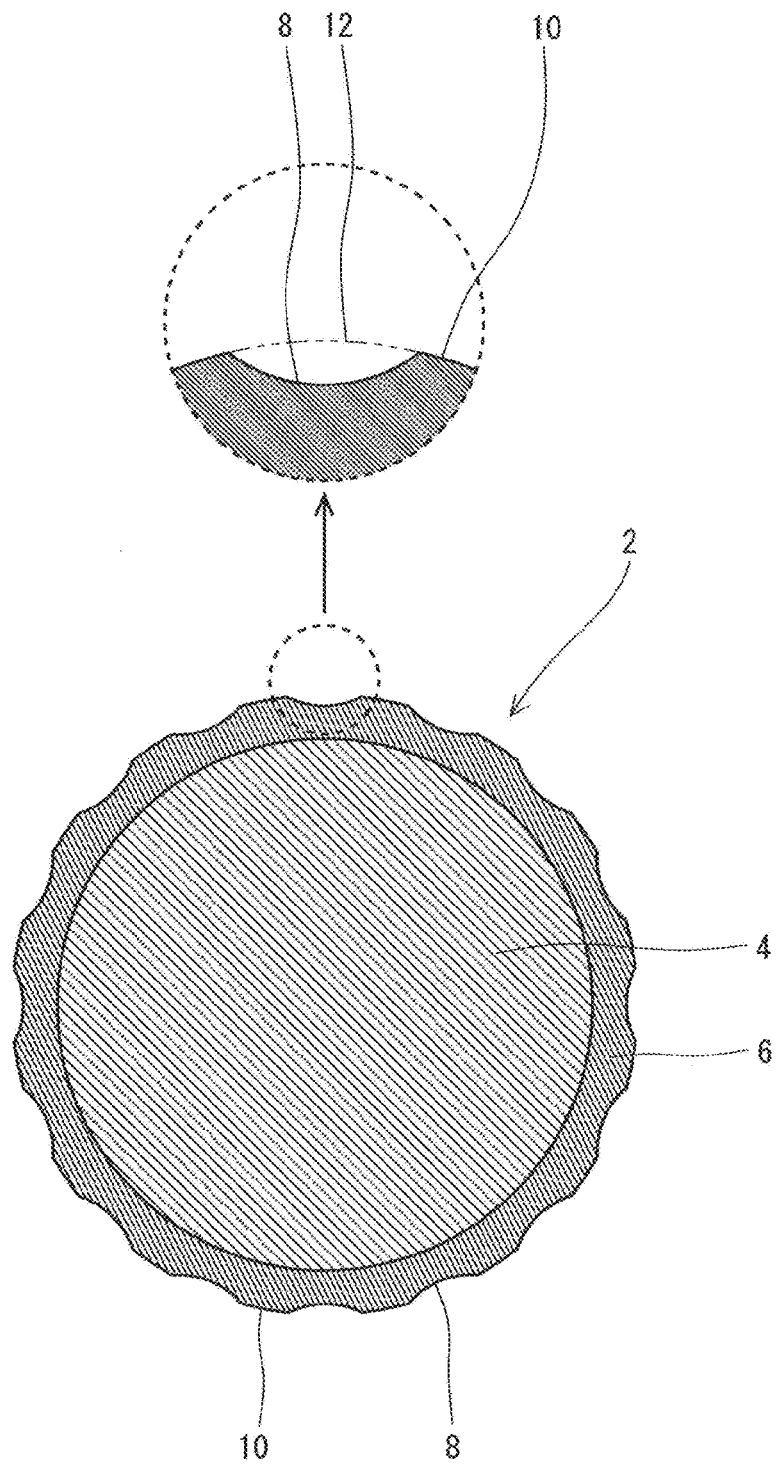
FIG. 1 is a schematic cross-sectional view of a golf ball according to one embodiment of the present invention.

A golf ball 2 shown in FIG. 1 includes a spherical core 4 and a cover 6. On the surface of the cover 6, a large number of dimples 8 are formed. Of the surface of the golf ball 2, a part other than the dimples 8 is a land 10. The golf ball 2 includes a paint layer and a mark layer on the external side of the cover 6 although these layers are not shown in the drawing. A mid layer may be provided between the core 4 and the cover 6.

The golf ball 2 has a diameter of preferably 40 mm or greater but 45 mm or less. From the standpoint of conformity to the rules established by the United States Golf Association (USGA), the diameter is particularly preferably equal to or greater than 42.67 mm. In light of suppression of air resistance, the diameter is more preferably equal to or less than 44 mm and particularly preferably equal to or less than 42.80 mm. The golf ball 2 has a weight of preferably 40 g or greater but 50 g or less. In light of attainment of great inertia, the weight is more preferably equal to or greater than 44 g and particularly preferably equal to or greater than 45.00 g. From the standpoint of conformity to the rules established by the USGA, the weight is particularly preferably equal to or less than 45.93 g.

The core 4 is formed by crosslinking a rubber composition. Examples of base rubbers for use in the rubber composition include polybutadienes, polyisoprenes, styrene-butadiene copolymers, ethylene-propylene-diene copolymers, and natural rubbers. Two or more rubbers may be used in combination. In light of resilience performance, polybutadienes are preferred, and, high-cis polybutadienes are particularly preferred.

In order to crosslink the core 4, a co-crosslinking agent can be used. Examples of preferable co-crosslinking agents in light of resilience performance include zinc acrylate, magnesium acrylate, zinc methacrylate, and magnesium methacrylate. Preferably, the rubber composition includes an organic peroxide together with a co-crosslinking agent. Examples of suitable organic peroxides include dicumyl peroxide, 1,1-bis(t-butylperoxy)-3,3,5-trimethylcyclohexane, 2,5-dimethyl-2,5-di(t-butylperoxy)hexane, and di-t-butyl peroxide.

According to need, various additives such as sulfur, a sulfur compound, a filler, an anti-aging agent, a coloring agent, a plasticizer, a dispersant, and the like are included in the rubber composition of the core 4 in an adequate amount. Crosslinked rubber powder or synthetic resin powder may also be included in the rubber composition.

The core 4 has a diameter of preferably 30.0 mm or greater and particularly preferably 38.0 mm or greater. The diameter of the core 4 is preferably equal to or less than 42.0 mm and particularly preferably equal to or less than 41.5 mm. The core 4 may be composed of two or more layers. The core 4 may have a rib on its surface.

A suitable polymer for the cover 6 is an ionomer resin. Examples of preferable ionomer resins include binary copolymers formed with an α-olefin and an α,β-unsaturated carboxylic acid having 3 to 8 carbon atoms. Examples of other preferable ionomer resins include ternary copolymers formed with: an α-olefin; an α,β-unsaturated carboxylic acid having 3 to 8 carbon atoms; and an α,β-unsaturated carboxylate ester having 2 to 22 carbon atoms. For the binary copolymers and ternary copolymers, preferable α-olefins are ethylene and propylene, while preferable α,β-unsaturated carboxylic acids are acrylic acid and methacrylic acid. In the binary copolymers and ternary copolymers, some of the carboxyl groups are neutralized with metal ions. Examples of metal ions for use in neutralization include sodium ion, potassium ion, lithium ion, zinc ion, calcium ion, magnesium ion, aluminum ion, and neodymium ion.

Another polymer may be used instead of or together with an ionomer resin. Examples of the other polymer include thermoplastic polyurethane elastomers, thermoplastic styrene elastomers, thermoplastic polyamide elastomers, thermoplastic polyester elastomers, and thermoplastic polyolefin elastomers. In light of spin performance, thermoplastic polyurethane elastomers are preferred.

According to need, a coloring agent such as titanium dioxide, a filler such as barium sulfate, a dispersant, an antioxidant, an ultraviolet absorber, a light stabilizer, a fluorescent material, a fluorescent brightener, and the like are included in the cover 6 in an adequate amount. For the purpose of adjusting specific gravity, powder of a metal with a high specific gravity such as tungsten, molybdenum, and the like may be included in the cover 6.

The cover 6 has a thickness of preferably 0.1 mm or greater and particularly preferably 0.3 mm or greater. The thickness of the cover 6 is preferably equal to or less than 2.5 mm and particularly preferably equal to or less than 2.2 mm. The cover 6 has a specific gravity of preferably 0.90 or greater and particularly preferably 0.95 or greater. The specific gravity of the cover 6 is preferably equal to or less than 1.10 and particularly preferably equal to or less than 1.05. The cover 6 may be composed of two or more layers. When the cover 6 has two or more layers, it is preferred that the sum of the thicknesses of all the layers is within the above range. When the cover 6 has two or more layers, it is preferred that the specific gravity of each layer is within the above range.

Figure 2:
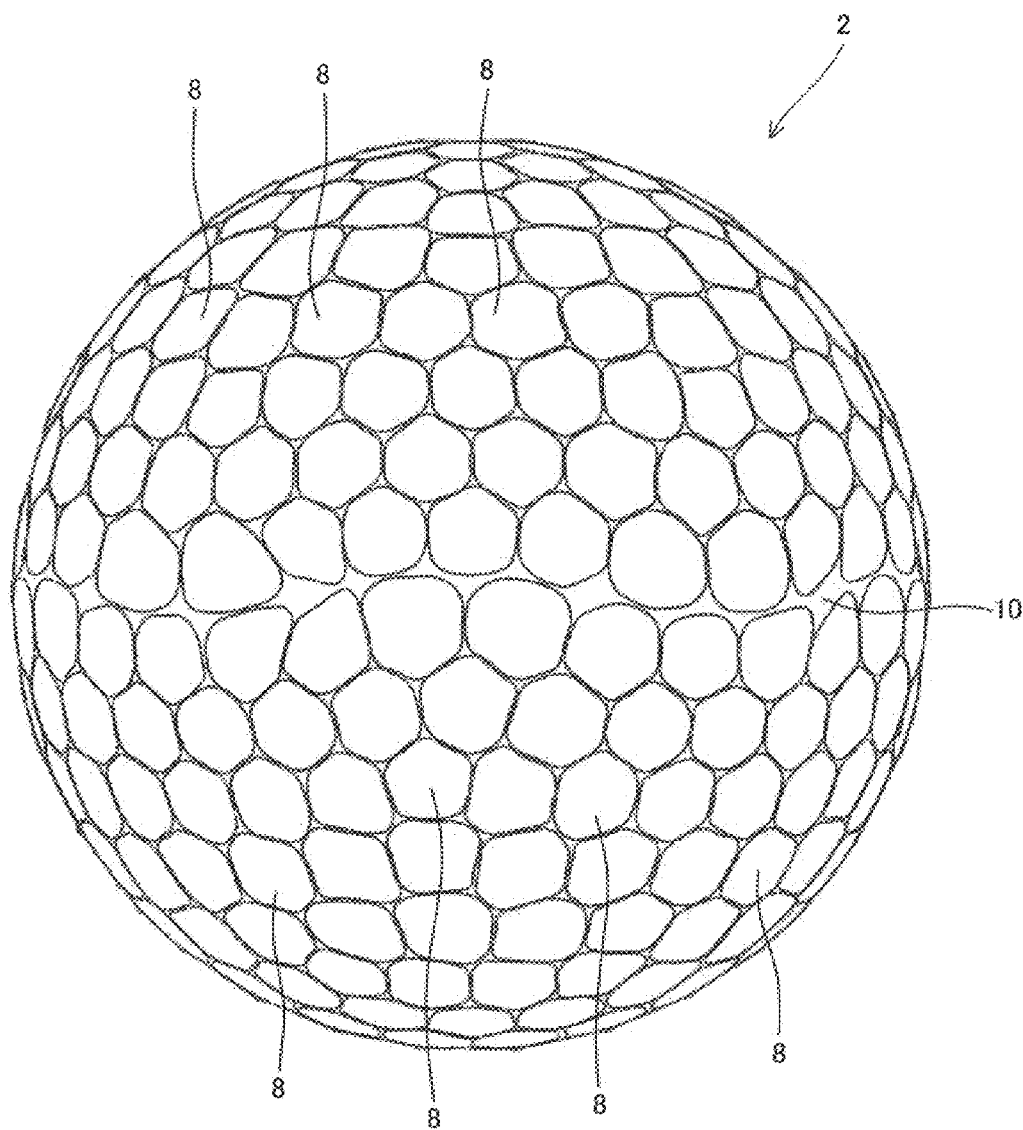
FIG. 2 is an enlarged front view of the golf ball in FIG. 1.
Figure 3:
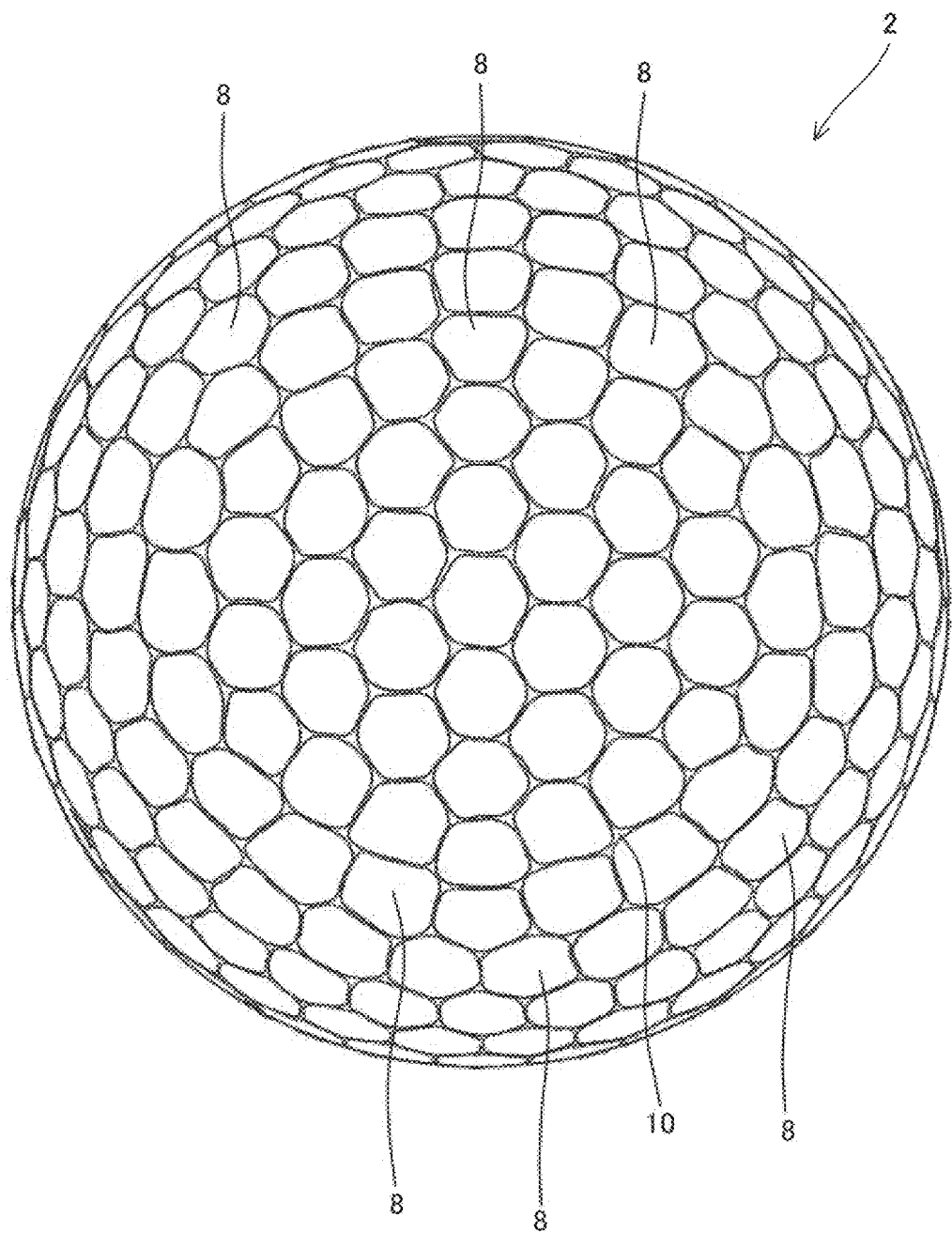
FIG. 3 is a plan view of the golf ball in FIG. 2.

FIG. 2 is an enlarged front view of the golf ball 2 in FIG. 1. FIG. 3 is a plan view of the golf ball 2 in FIG. 2. As is obvious from FIGS. 2 and 3, the golf ball 2 has a large number of non-circular dimples 8. By these dimples 8 and the land 10, a rugged pattern is formed on the surface of the golf ball 2.

In a process for designing the rugged pattern, a Voronoi tessellation is used. In the designing process, a large number of generating points are arranged on the surface of a phantom sphere 12 (see FIG. 1). A large number of regions are assumed on the surface of the phantom sphere 12 based on the generating points by the Voronoi tessellation. In the present specification, these regions are referred to as "Voronoi regions". Dimples 8 and a land 10 are assigned based on the contours of these Voronoi regions. The designing process is preferably executed using a computer and software in light of efficiency. Of course, the present invention is practicable even by hand calculation. The essence of the present invention is not in a computer and software. The following will describe the designing process in detail.

Figure 4:
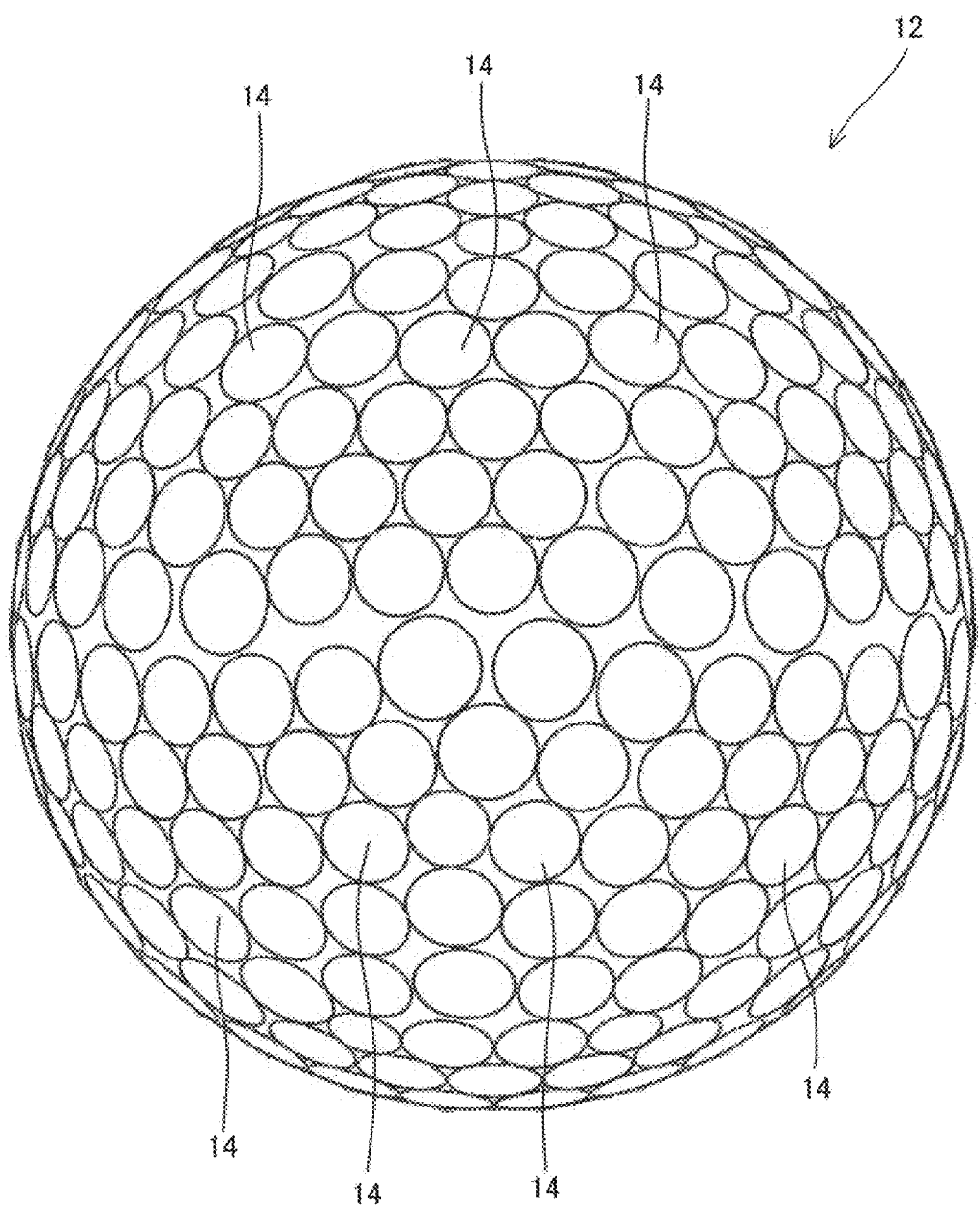
FIG. 4 is a front view of a phantom sphere in which a large number of circles are assumed on a surface thereof.
Figure 5:
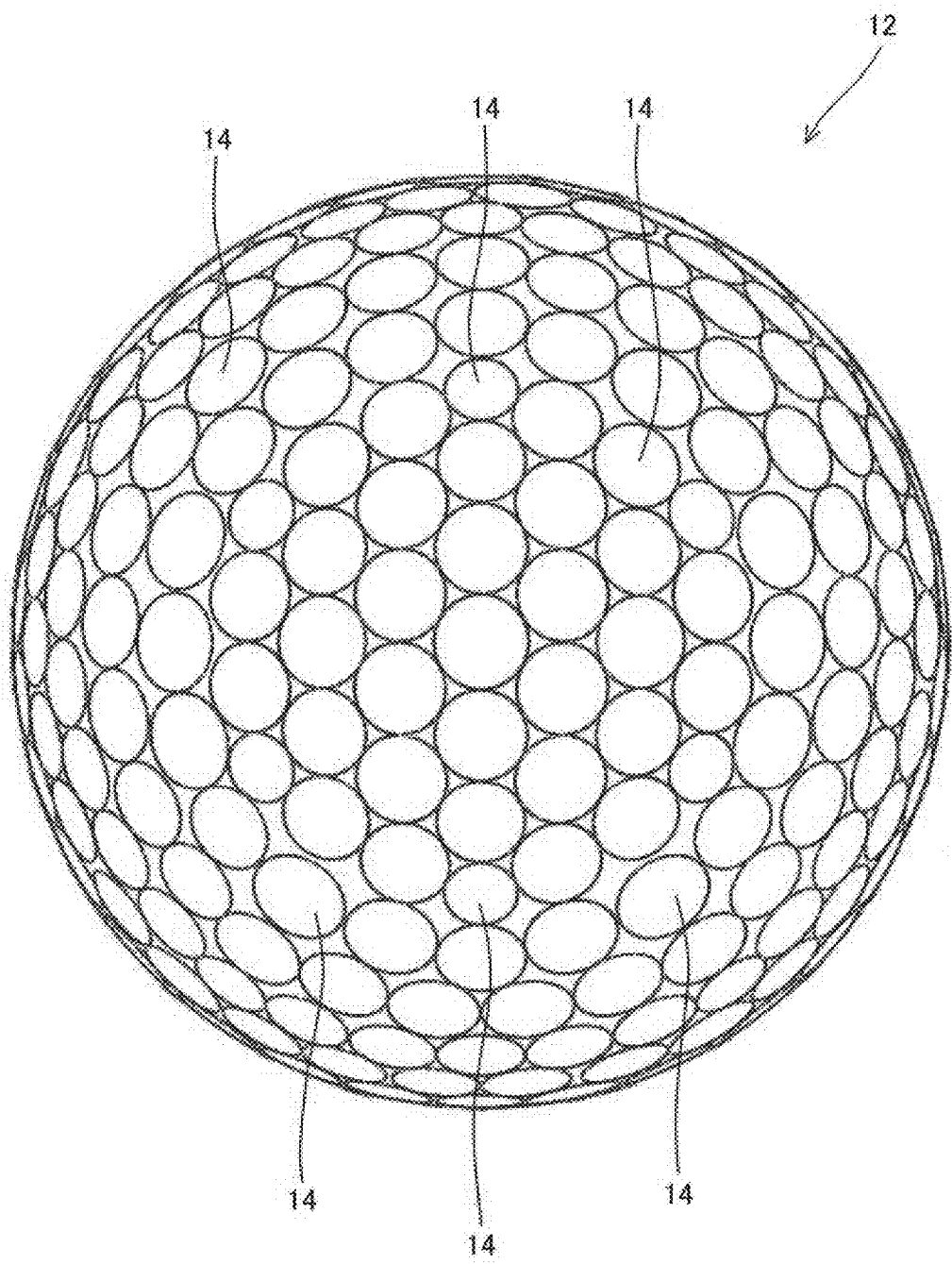
FIG. 5 is a plan view of the phantom sphere FIG. 4.

In the designing process, as shown in FIGS. 4 and 5, a large number of circles 14 are assumed on the surface of the phantom sphere 12. The method for assuming these circles 14 is the same as a process for designing a dimple pattern having circular dimples. The process for designing a dimple pattern having circular dimples is well known to one skilled in the art. Each of the circles 14 coincides with the contour of a circular dimple. In the present embodiment, the number of the circles 14 is 344.

Figure 6:
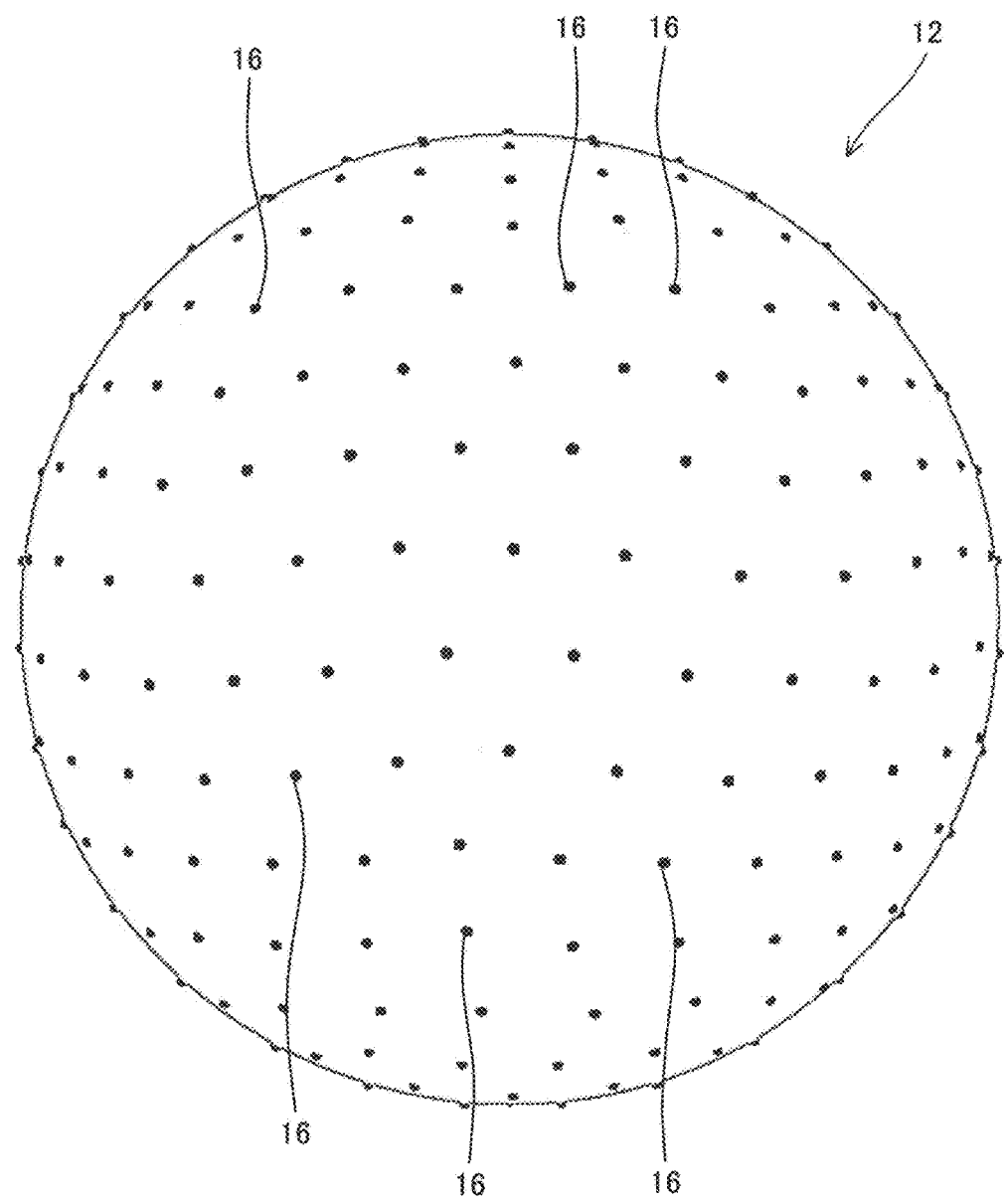
FIG. 6 is a front view of a phantom sphere in which a large number of generating points are assumed on a surface thereof.
Figure 7:
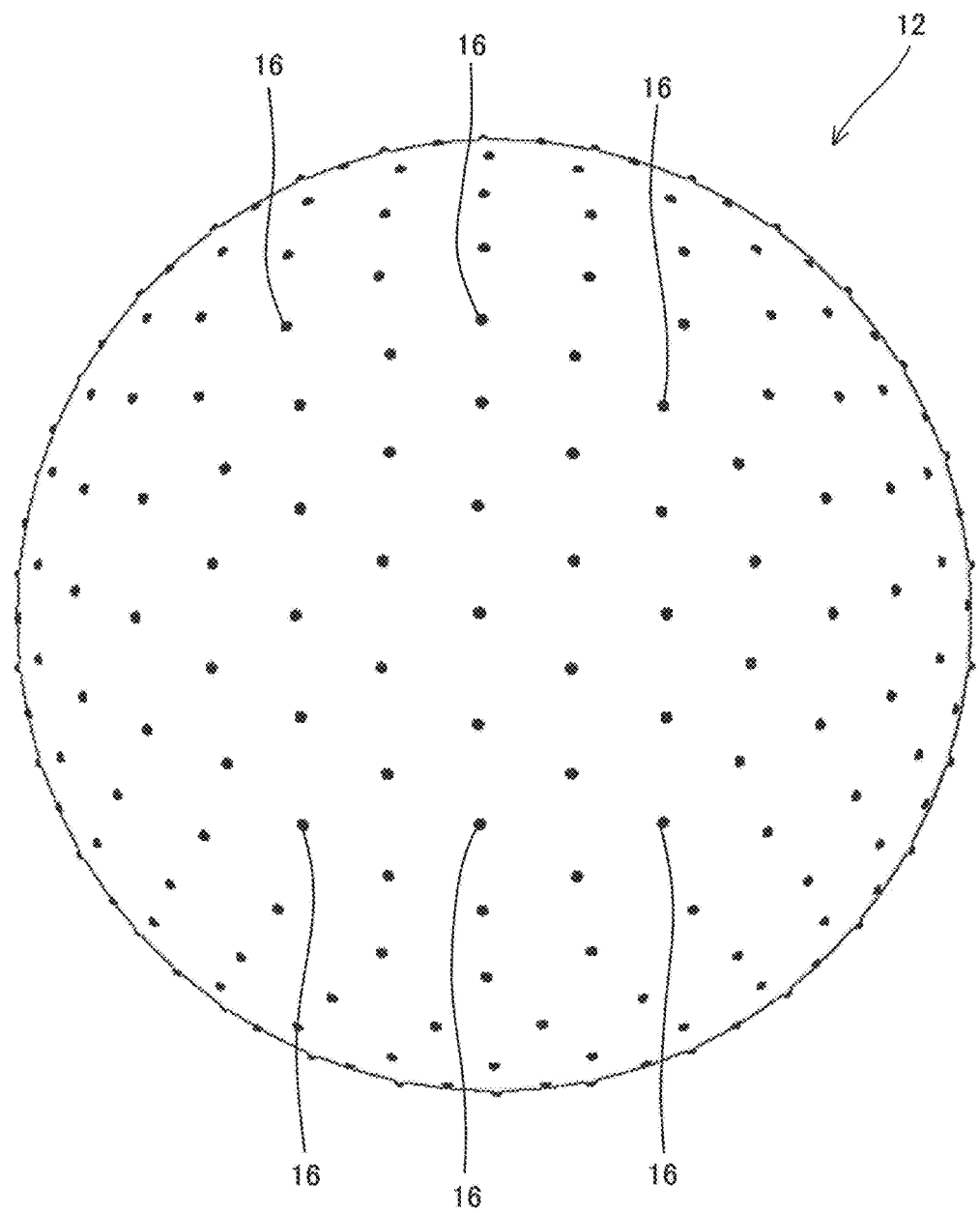
FIG. 7 is a plan view of the phantom sphere in FIG. 6.

A large number of generating points are assumed on the surface of the phantom sphere 12 based on the positions of these circles 14. In the present embodiment, the center of each circle 14 is assumed as a generating point. FIGS. 6 and 7 show these generating points 16. In the present embodiment, since the number of the circles 14 is 344, the number of the generating points 16 is 344. A point obtained by projecting the center of each circle 14 onto the surface of the phantom sphere 12 may be assumed as a generating point 16. This projection is performed by light emitted from the center of the phantom sphere 12. A generating point may be assumed based on a point other than the center. For example, a point on a circumference may be set as a generating point.

Figure 8:
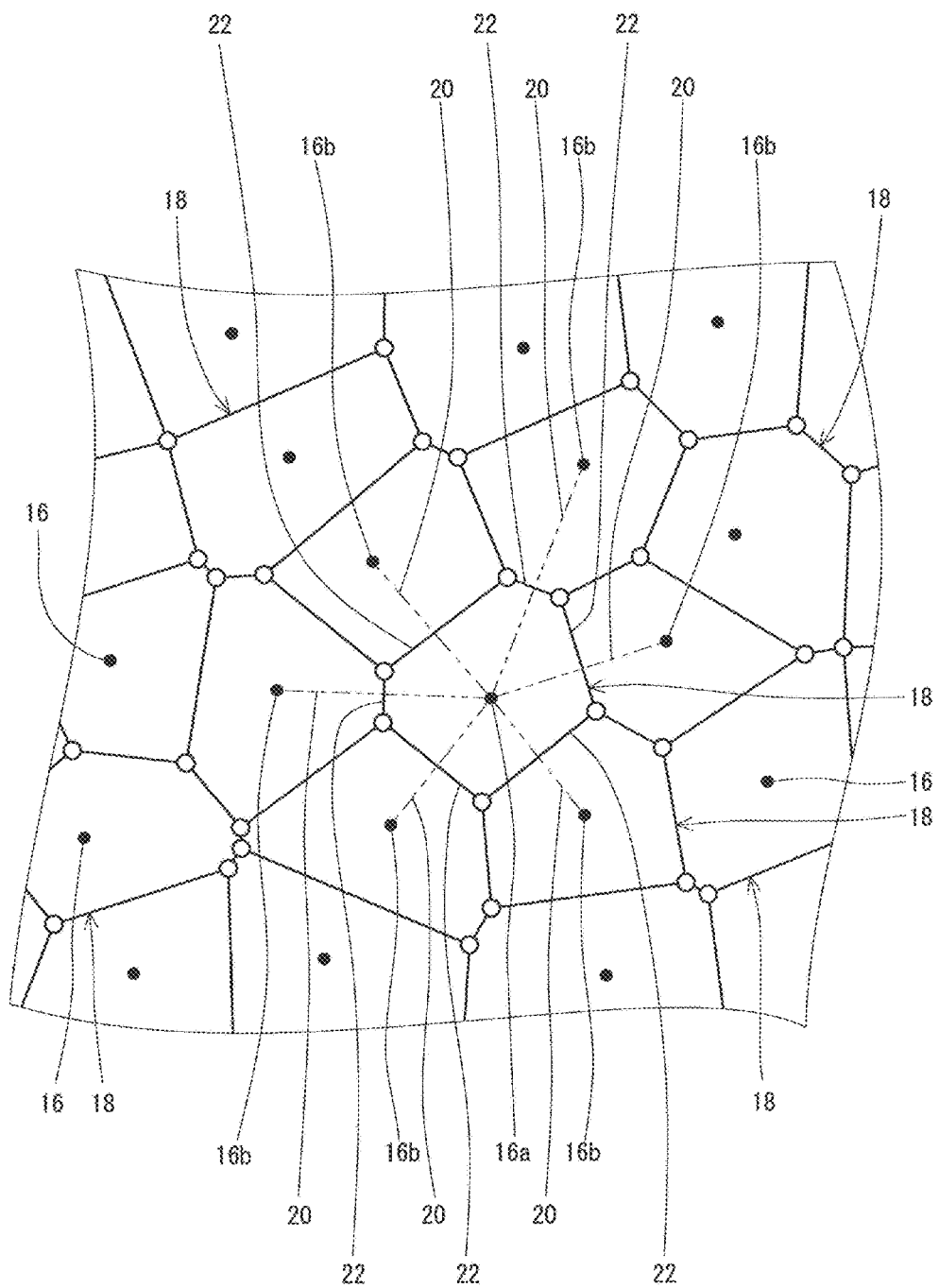
FIG. 8 is an enlarged view showing the generating points in FIG. 6 with Voronoi regions.

A large number of Voronoi regions are assumed based on these generating points 16. FIG. 8 shows the Voronoi regions 18. In FIG. 8, a generating point 16a is adjacent to six generating points 16b. What is indicated by each reference sign 20 is a line segment connecting the generating point 16a to the generating point 16b. FIG. 8 shows six line segments 20. What is indicated by each reference sign 22 is the perpendicular bisector of each line segment 20. The generating point 16a is surrounded by six perpendicular bisectors 22. What is indicated by each outline circle in FIG. 8 is the intersection point between a perpendicular bisector 22 and another perpendicular bisector 22. A point obtained by projecting the intersection point onto: the surface of the phantom sphere 12 is a vertex of a spherical polygon (e.g., a spherical hexagon). This projection is performed by light emitted from the center of the phantom sphere 12. The spherical polygon is a Voronoi region 18. The surface of the phantom sphere 12 is divided into a large number of the Voronoi regions 18. The method for the division is referred to as a Voronoi tessellation. In the present embodiment, since the number of the generating points 16 is 344, the number of the Voronoi regions 18 is 344.

Figure 9:
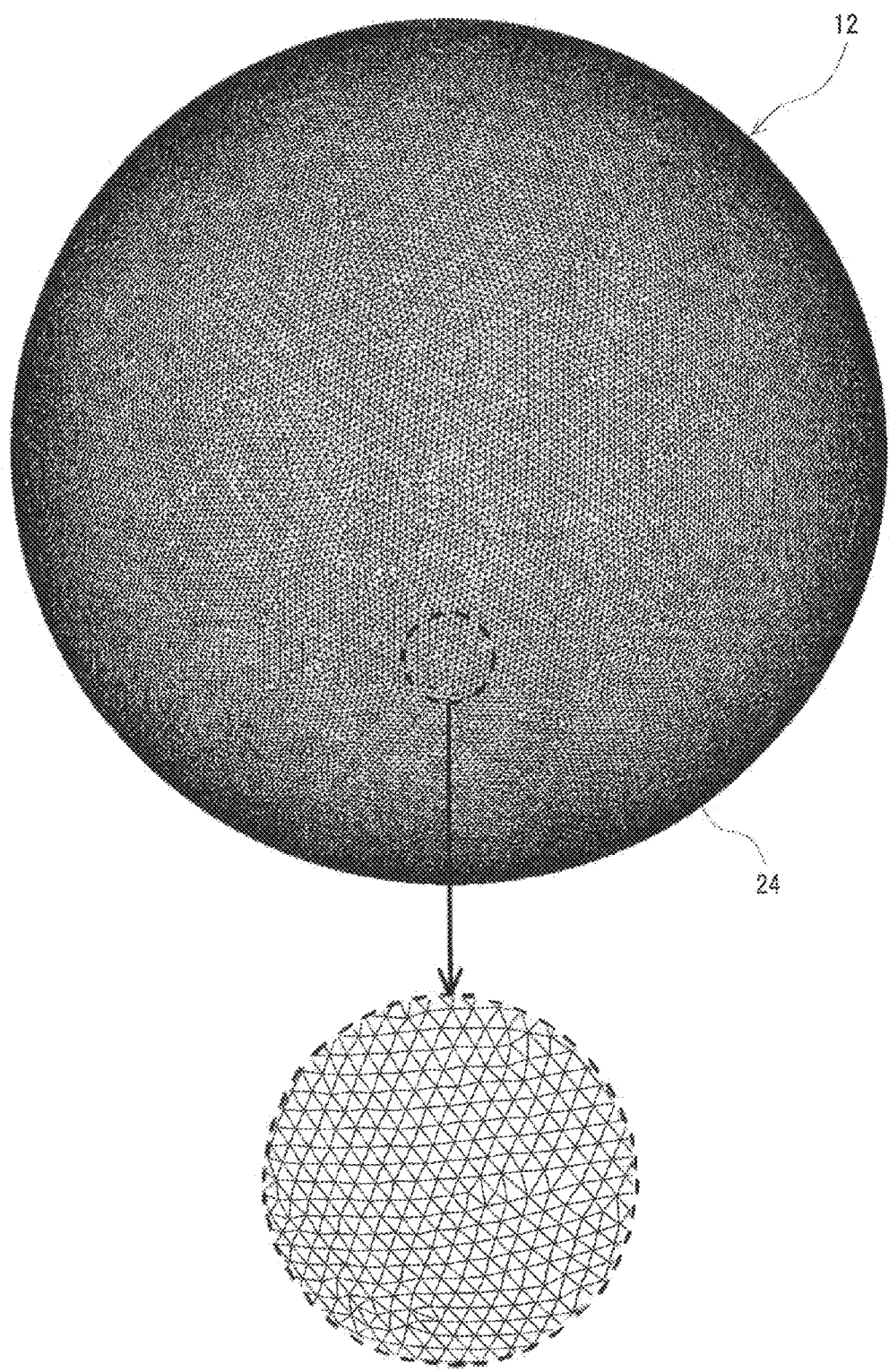
FIG. 9 is a front view of a mesh used in a Voronoi tessellation.

Calculation for defining the contour of each Voronoi region 18 based on the perpendicular bisectors 22 is complicated. The following will describe a method for simply obtaining Voronoi regions 18. In the method, the surface of the phantom sphere 12 is divided into a large number of spherical triangles. This division is performed based on an advancing front method. The advancing front method is disclosed at Pages 195 to 197 of "Daigakuin Johoshorikogaku 3, Keisan Rikigaku (Information Science and Technology for Graduate School 3, Computational Dynamics)" (edited by Koichi ITO, published by Kodansha Ltd.). A mesh 24 shown in FIG. 9 is obtained by this division. The mesh 24 has 314086 triangles and 157045 vertices. Each vertex is defined as a cell (or the center of a cell). The mesh 24 has 157045 cells. The phantom sphere 12 may be divided by other methods. The number of the cells is preferably equal to or greater than 10000 and particularly preferably equal to or greater than 100000.

The distances between each cell in the mesh 24 and all the generating points 16 are calculated. For each cell, distances of which the number is the same as the number of the generating points 16 are calculated. The shortest distance is selected from among these distances. The cell is associated with the generating point 16 on which the shortest distance is based. In other words, the generating point 16 that is closest to the cell is selected. It is noted that calculation of the distances between the cell and the generating points 16 whose distances from the cell are obviously large may be omitted.

Figure 10:
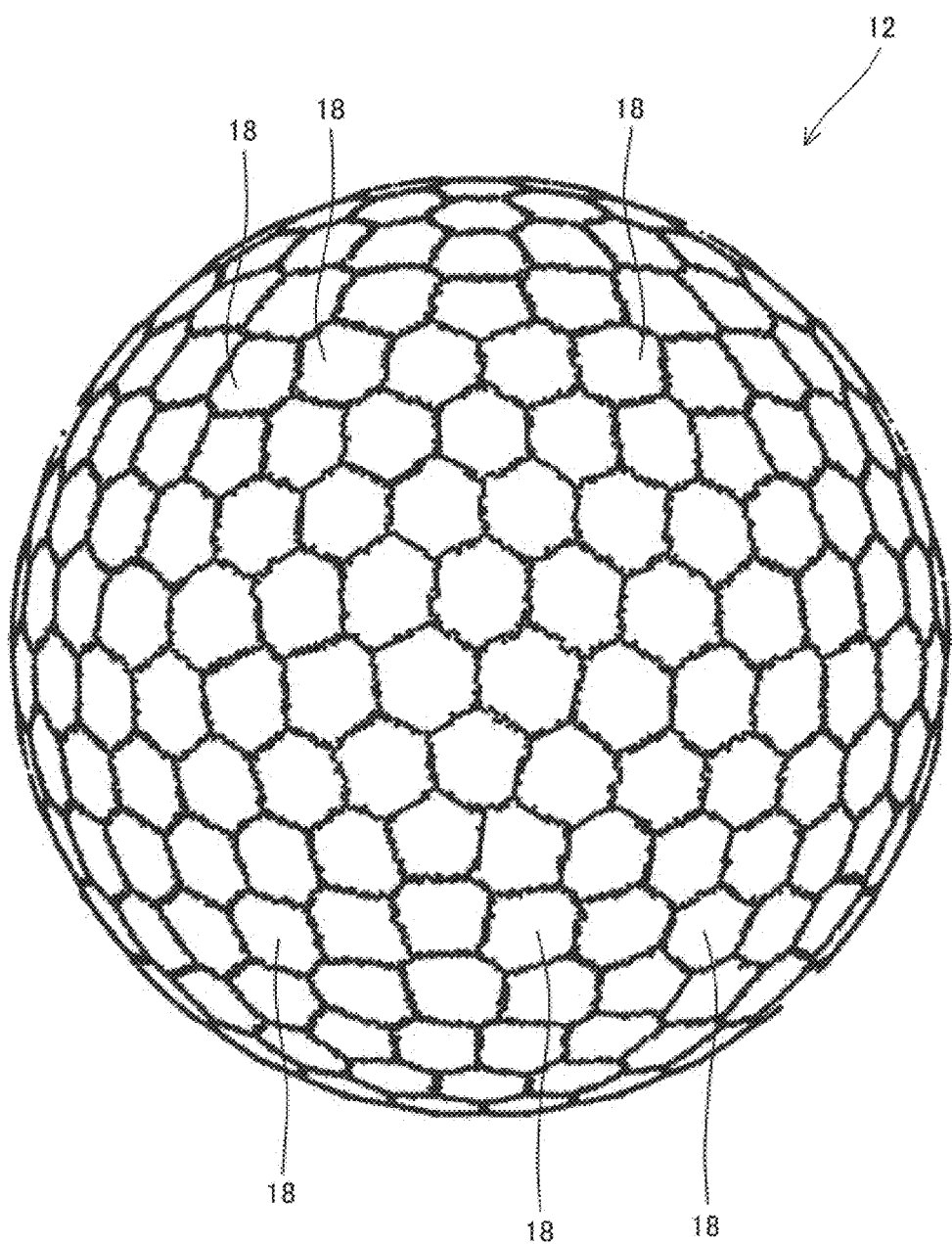
FIG. 10 is a front view of a phantom sphere in which Voronoi regions obtained by a simple method are assumed.
Figure 11:
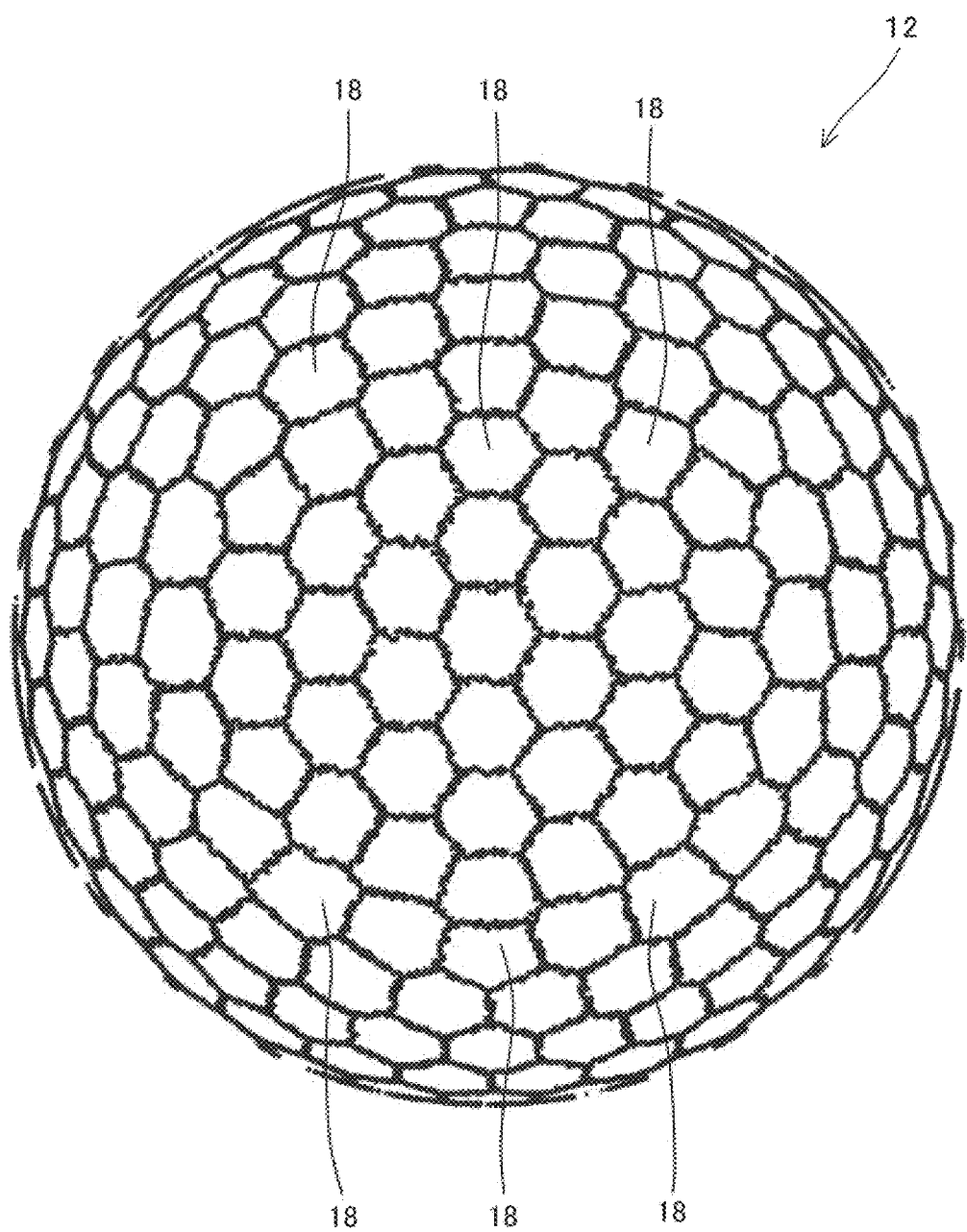
FIG. 11 is a plan view of the phantom sphere in FIG. 10.

For each generating point 16, a set of cells associated with the generating point 16 is assumed. In other words, a set of cells for which this generating point 16 is the closest generating point 16 is assumed. The set is set as a Voronoi region 18. A large number of the Voronoi regions 18 obtained thus are shown in FIGS. 10 and 11. In FIGS. 10 and 11, when another cell adjacent to a certain cell belongs to a Voronoi region 18 different from a Voronoi region 18 to which the certain cell belongs, the certain cell is filled with black.

As is obvious from FIGS. 10 and 11, the contour of each Voronoi region 18 is a zigzag contour. This contour is subjected to smoothing or the like. Typical smoothing is moving averaging. Smoothing by three-point moving average, five-point moving average, seven-point moving average, or the like can be used.

In the three-point moving average, coordinates of the following three cells are averaged:
(1) a cell;
(2) a cell that is closest to the cell in a clockwise direction; and
(3) a cell that is closest to the cell in a counterclockwise direction.

In the five-point moving average, coordinates of the following five cells are averaged:
(1) a cell;
(2) a cell that is closest to the cell in the clockwise direction;
(3) a cell that is closest to the cell in the counterclockwise direction;
(4) a cell that is second closest to the cell in the clockwise direction; and
(5) a cell that is second closest to the cell in the counterclockwise direction.

In the seven-point moving average, coordinates of the following seven cells are averaged:
(1) a cell;
(2) a cell that is closest to the cell in the clockwise direction;
(3) a cell that is closest to the cell in the counterclockwise direction;
(4) a cell that is second closest to the cell in the clockwise direction;
(5) a cell that is second closest to the cell in the counterclockwise direction;
(6) a cell that is third closest to the cell in the clockwise direction; and
(7) a cell that is third closest to the cell in the counterclockwise direction.

Figure 16:
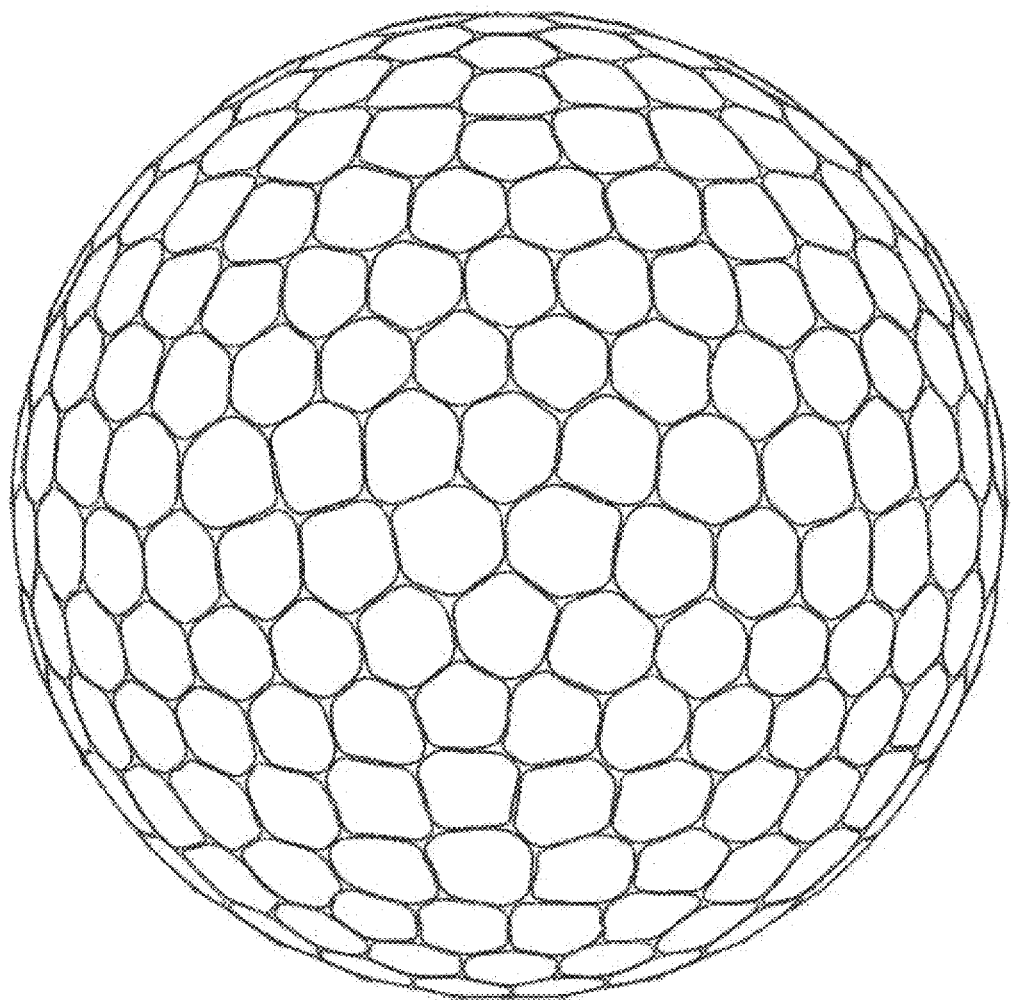
FIG. 16 is a front view of a phantom sphere having loops.
Figure 17:
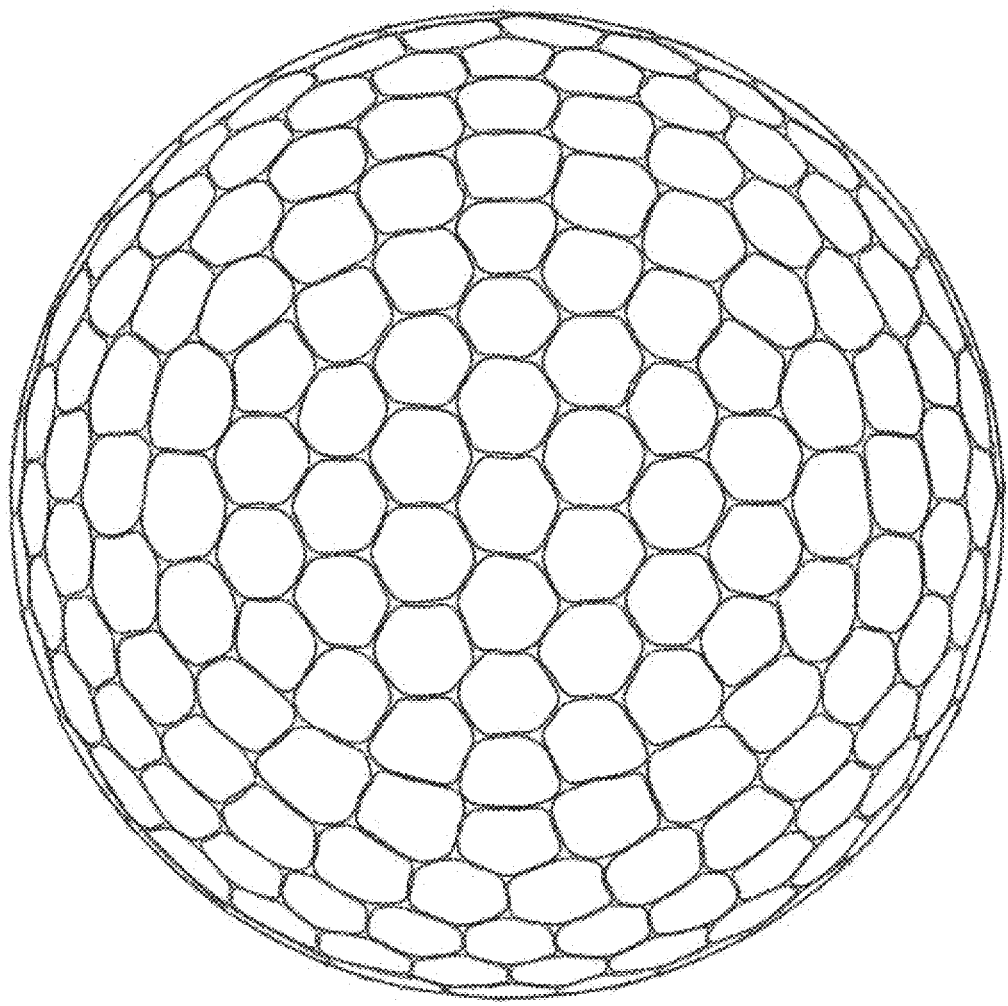
FIG. 17 is a plan view of the phantom sphere FIG. 16.

A plurality of points having the coordinates obtained by the moving average are connected to each other by a spline curve. A loop is obtained by the spline curve. When forming a loop, some of the points may be removed, and a spline curve may be drawn. The loop may be enlarged or reduced in size to obtain a new loop. A land 10 is assigned onto the loop or to the outside of the loop. In other words, a land 10 is assigned to the vicinity of the contour of the Voronoi region 18. Meanwhile, a dimple 8 is assigned to the inside of the loop or onto the loop. In this manner, a rugged pattern shown in FIGS. 16 and 17 is obtained.

The following will described an example of a method for assigning a dimple 8. In the method, a deepest point is decided. Preferably, a deepest point is assumed on a line connecting the center of the loop to the center of the phantom sphere 12. A coordinate of the center of the loop is the average of coordinates of all reference points that define the loop. The deepest point is projected on the surface of the phantom sphere 12. A circular arc, which passes through the projected point and lies on the surface of the phantom sphere 12 and whose both ends lie on the loop, is assumed. A smooth curve, which passes through both ends of the circular arc and the deepest point and is convex inwardly in the radial direction of the golf ball 2, is assumed. Preferably, the smooth curve is a circular arc. The smooth curve and the loop are connected to each other by a smooth curved surface. Due to this, a dimple 8 is obtained. A dimple 8 may be obtained by connecting the deepest point to the loop by a smooth curved surface.

In the present specification, latitudes on the golf ball 2 are defined as follows.

North pole: 90°
Equator: 0°
South pole: −90°

A zone in which a latitude is equal to or greater than −10° and equal to or less than 10° is referred to as a near-equator zone. A dimple whose central point is included in the near-equator zone is a dimple present in the near-equator zone. A dimple whose central point is not included in the near-equator zone is not a dimple present in the near-equator zone.

The dimples 8 in the near-equator zone are corrected based on the pattern shown in FIGS. 16 and 17. Specifically, the contours of the dimples 8 are changed such that the areas of the dimples 8 are decreased. In this correction, in order that the occupation ratio is not decreased even when the areas of the dimples 8 are decreased, the number of the dimples 8 may be increased. A rugged pattern obtained after the correction is shown in FIGS. 2 and 3. The contours of some of the dimples 8 present in the near-equator zone are changed. The contours of all the dimples 8 present in the near-equator zone may be changed. The correction of the dimples 8 may be omitted.

The area Amax of the dimple 8 having a maximum area A among the dimples 8 present in the near-equator zone is equal to or less than 22.0 mm². In the golf ball 2, the volumes of the dimples 8 are restrained from being reduced considerably by cutting of spew at the seam. In addition, in the golf ball 2, variations of the volumes of the dimples 8 when the depth of cutting is varied are suppressed. In the golf ball 2, the aerodynamic symmetry is less likely to be impaired by the cutting. In the golf ball 2, variations of the flight performance by the cutting are less likely to occur. The area Amax is preferably equal to or less than 21.0 mm² and particularly preferably equal to Or less than 20.0 mm². The area Amax is preferably equal to or greater than 17.0 mm².

Prior to measurement of the area A of each dimple 8, 30 points are assumed on the contour of the dimple 8. These points are assumed at intervals of an angle of 12° at a center O. In the measurement of the area A, the dimple 8 is approximately divided into 30 triangles. Each triangle has the following three vertices:

(i) a first point assumed on the contour;
(ii) a second point that is assumed on the contour and adjacent to the first point; and
(iii) the central point O.

The sum of the areas of the 30 triangles is regarded as the area A of the dimple 8.

The average Aave of the areas A of all the dimples 8 present in the near-equator zone is equal to or less than 18.0 mm². In the golf ball 2, the volumes of the dimples 8 are restrained from being reduced considerably by cutting of spew at the seam. In addition, in the golf ball 2, variations of the volumes of the dimples 8 when the depth of cutting is varied are suppressed. In the golf ball 2, the aerodynamic symmetry is less likely to be impaired by the cutting. In the golf ball 2, variations of the flight performance by the cutting are less likely to occur. The average Aave is more preferably equal to or less than 17.0 mm² and particularly preferably equal to or less than 16.0 mm². The average Aave is preferably equal to or greater than 13.0 mm².

In light of flight performance of the golf ball 2, the occupation ratio of the dimples 8 is preferably equal to or greater than 85%, more preferably equal to or greater than 90%, and particularly preferably equal to or greater than 92%. In light of durability of the golf ball 2, the occupation ratio is preferably equal to or less than 98%. In the present embodiment, the occupation ratio is 92% Use of the Voronoi tessellation achieves a high occupation ratio even when no small dimple 8 is arranged.

As is obvious from FIGS. 2 and 3, the dimples 8 are not orderly arranged in the golf ball 2. The golf ball 2 has a large number of types of dimples 8 whose contour shapes are different from each other. These dimples 8 achieve a superior dimple effect. The number of the types of the dimples 8 is preferably equal to or greater than 50 and particularly preferably equal to or greater than 100. In the present embodiment, each dimple 8 has a contour shape different from those of any Other dimples 8.

In light of suppression of rising of the golf ball 2 during flight, each dimple 8 has a depth of preferably 0.05 mm or greater, more preferably 0.08 mm or greater, and particularly preferably 0.10 mm or greater. In light of suppression of dropping of the golf ball 2 during flight, the depth is preferably equal to or less than 0.60 mm, more preferably equal to or less than 0.45 mm, and particularly preferably equal to or less than 0.40 mm. The depth is the distance between the deepest point of the dimple 8 and the surface of the phantom sphere 12.

In the present invention, the term "dimple volume" means the volume of a part surrounded by the surface of the phantom sphere 12 and the surface of the dimple 8. In light of suppression of rising of the golf ball 2 during flight, the sum of the volumes (total volume) of all the dimples 8 is preferably equal to or greater than 500 mm³, more preferably equal to or greater than 550 mm³, and particularly preferably equal to or greater than 600 mm³. In light of suppression of dropping of the golf ball 2 during flight, the sum is preferably equal to or less than 900 mm³, more preferably equal to or less than 850 mm³, and particularly preferably equal to or less than 800 mm³.

From the standpoint that a fundamental feature of the golf ball 2 being substantially a sphere is not impaired, the total number of the dimples 8 is preferably equal to or greater than 250, more preferably equal to or greater than 280, and particularly preferably equal to or greater than 340. From the standpoint, that each dimple 8 can contribute to the dimple effect, the total number is preferably equal to or less than 450, more preferably equal to or less than 400, and particularly preferably equal to or less than 370.

As described above, prior to the Voronoi tessellation, a large number of the circles 14 are assumed on the surface of the phantom sphere 12. From the standpoint that the dimples 8 can be uniformly arranged, it is preferred that the circles 14 are assumed such that one or more of conditions indicated in the following (1) to (4) are met.

(1) Each circle 14 does not intersect other circles 14 adjacent to the circle 14.
(2) The diameter of each circle 14 is equal to or greater than 2.0 mm but equal to or less than 6.0 mm.
(3) The number of the circles 14 is equal to or greater than 280 but equal to or less than 450.
(4) The ratio of the total area of the circles 14 to the area of the surface of the phantom sphere 12 is equal to or greater than 60%.

Preferably, the circles 14 are assumed such that all the conditions indicated in the above (1) to (4) are met.

Figure 12:
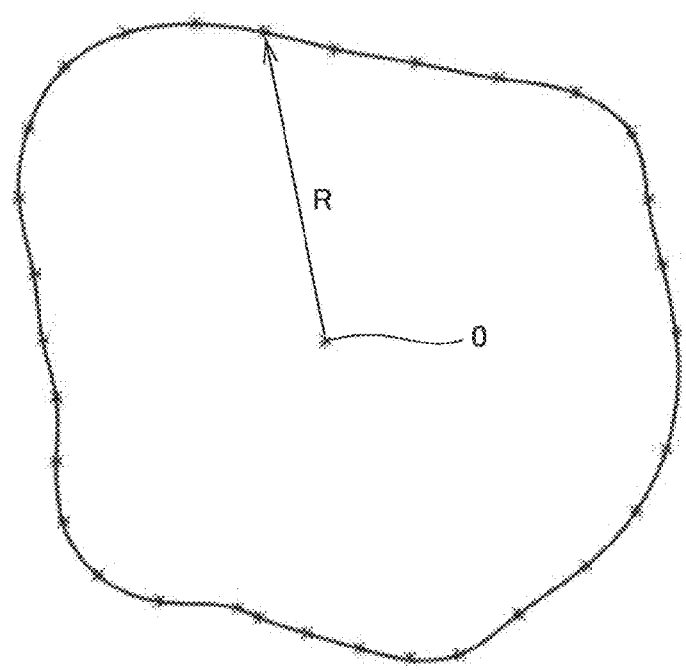
FIG. 12 is an enlarged view of a dimple of the golf ball in FIG. 2.

The golf ball 2 has dimples 8 having a radius variation range Rh of 0.4 mm or greater. A method for calculating a radius variation range Rh is shown in FIG. 12. In this method, a coordinate of the center O is decided by averaging coordinates of all control points on the contour of the dimple 8. The control points are selected from cells on the contour. Typically, the selection of cells is made by removing. In the present embodiment, the number of the control points per dimple 8 is 30. The number of the control points is not limited to 30. The number of the control points is preferably equal to or greater than 10 but equal to or less than 50. All cells on the contour of the dimple 8 may be selected as control points.

Figure 13:
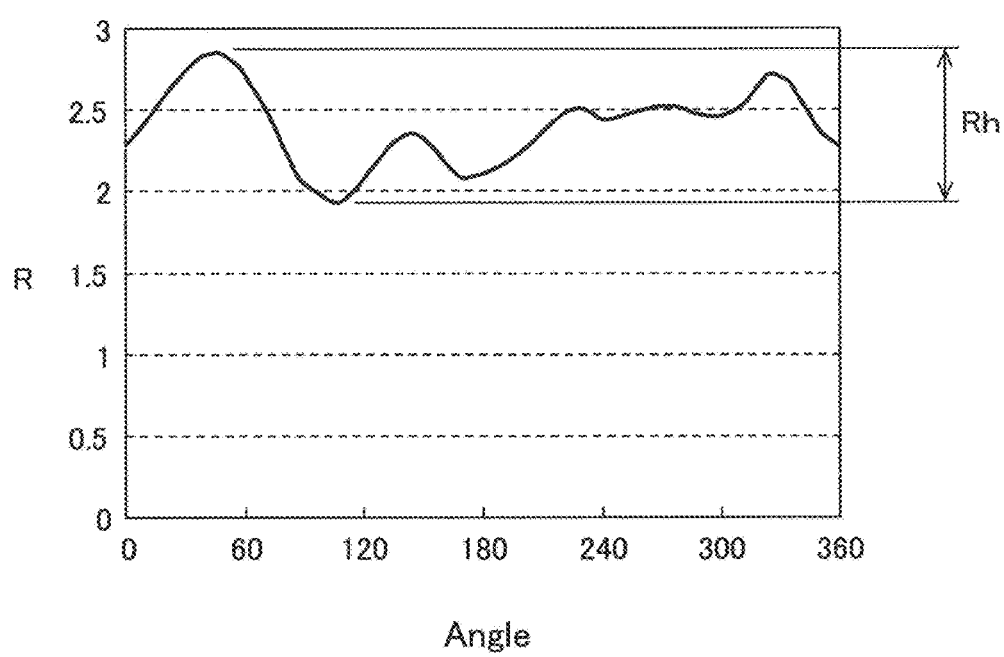
FIG. 13 is a graph for explaining a method for calculating a radius variation range of the dimple in FIG. 12.

After the coordinate of the center O is decided, the distance between the center O and the control point (i.e., a radius R) is calculated. For each control point, the radius R is calculated. FIG. 13 is a graph in which the radius R is plotted. The horizontal axis of the graph indicates an angle of a line connecting the center O to each control point, relative to a longitude direction. As shown in the graph, a value obtained by subtracting the minimum value of the radius R from the maximum value of the radius R is the radius variation range Rh. The radius variation range Rh is an index indicating distortion of the dimple 8.

The radius R may be decided based on points assumed on the contour of the dimple 8, not based on the control points. The radius variation range Rh is calculated based on 30 points on the contour of the dimple 8. These points are assumed at intervals of an angle of 12° at the center O. The number of the assumed points is not limited to 30. The number of the assumed points is preferably equal to or greater than 10 but equal to or less than 50. When the number of the assumed points is n, the angle at the central point O is $(360/n)°$.

It suffices that the radius variation range Rh calculated by any one of the calculation methods described above is equal to or greater than 0.4 mm.

In the golf ball 2 having the dimples 8 having a radius variation range Rh of 0.4 mm or greater, the dimples 8 are not orderly arranged. The golf ball 2 has excellent flight performance. The ratio P1 of the number N1 of the dimples 8 having a radius variation range Rh of 0.4 mm or greater relative to the total number N of the dimples 8 is preferably equal to or greater than 30%, more preferably equal to or greater than 50%, and particularly preferably equal to or greater than 70%. The ratio P1 is ideally 100%. In the golf ball 2 shown in FIGS. 2 and 3, the ratio P1 is 81%.

As is obvious from FIG. 13, variation of the radius R of the dimple 8 is not periodic. In the golf ball 2, the dimples 8 are not orderly arranged. The golf ball 2 has excellent flight performance.

In light of flight performance, the difference between the radius variation range Rhmax of the dimple 8 having a maximum radius variation range Rh and the radius variation range Rhmin of the dimple 8 having a minimum radius variation range Rh is preferably equal to or greater than 0.1 mm, more preferably equal to or greater than 0.3 mm, and particularly preferably equal to or greater than 0.5 mm.

In light of flight performance, the standard deviation of the radius variation ranges Rh of all the dimples 8 is preferably equal to or greater than 0.10 and particularly preferably equal to or greater than 0.13.

The golf ball 2 has dimples 8 that meet the following mathematical formula (1).

$$Rh/Rave \geq 0.25 \qquad (1)$$

In this mathematical formula, Rh represents a radius variation range, and Rave represents an average radius. Rave is the average of the radii R at all control points that a single dimple 8 has.

The average radius Rave may be decided based on all cells present on the contour of the dimple 8, not based on the control points.

The average radius Rave may be decided based on points assumed on the contour of the dimple 8. Specifically, the average radius Rave is calculated based on 30 points on the contour of the dimple 8. These points are assumed at intervals of an angle of 12° at the center O. The number of the assumed points is not limited to 30. The number of the assumed points is preferably equal to or greater than 10 but equal to or less than 50. When the number of the assumed points is n, the angle at the central point O is $(360/n)°$.

It suffices that a pair of the radius variation range Rh and the average radius Rave calculated by any of the calculation methods described above meets the above mathematical formula (1).

In the golf ball 2 having the dimples 8 that meet the above mathematical formula (1), the dimples 8 are not orderly arranged. The golf ball 2 has excellent flight performance. The ratio P2 of the number N2 of the dimples 8 that meet the above mathematical formula (1), relative to the total number N of the dimples 8, is preferably equal to or greater than 10%, more preferably equal to or greater than 20%, and particularly preferably equal to or greater than 30%. The ratio P2 is ideally 100%. In the golf ball 2 shown in FIGS. 2 and 3, the ratio P2 is 36%.

In light of flight performance, it is preferred that the golf ball 2 meets the following mathematical formula (2).

$$(Rh\max - Rh\min) > (R1 - R2) \qquad (2)$$

In the mathematical formula, Rhmax represents the radius variation range of the dimple 8 having a maximum radius variation range Rh, Rhmin represents the radius variation range of the dimple 8 having a minimum radius variation range Rh, R1 represents the average radius of the dimple 8 having a maximum radius variation range Rh, and R2 represents the average radius of the dimple 8 having a minimum radius variation range Rh. The difference between (Rhmax−Rhmin) and (R1−R2) is preferably equal to or greater than 0.1 mm, more preferably equal to or greater than 0.2 mm, and particularly preferably equal to or greater than 0.3 mm. In the golf ball 2 shown in FIGS. 2 and 3, the difference is 0.449 mm.

In light of flight performance during PH rotation, it is preferred that the dimples 8 having a radius variation range Rh of 0.4 mm or greater are present in the near-equator zone. The ratio PE1 of the number NE1 of the dimples 8 having a radius variation range Rh of 0.4 mm or greater in the near-equator zone, relative to the total number NE of the dimples 8 in the near-equator zone, is preferably equal to or greater than 30%, more preferably equal to or greater than 50%, and particularly preferably equal to or greater than 70%. The ratio PE1 is ideally 100%. In the golf ball 2 shown in FIGS. 2 and 3, the ratio PE1 is 100%.

In light of flight performance during PH rotation, it is preferred that the dimples 8 that meet the above mathematical formula (1) are present in the near-equator zone. The ratio PE2 of the number NE2 of the dimples a that meet the above mathematical formula (1) in the near-equator zone, relative to the total number NE of the dimples 8 in the near-equator zone, is preferably equal to or greater than 10%, more preferably equal to or greater than 20%, and particularly preferably equal to or greater than 30%. The ratio PE2 is ideally 100%. In the golf ball 2 shown in FIGS. 2 and 3, the ratio PE2 is 48%.

The number of the dimples 8 in the near-equator zone is preferably equal to or greater than 30 but equal to less than 90, and particularly preferably equal to or greater than 40 but equal to or less than 60.

As described above, in the present embodiment, a pattern of the circles 14 is obtained by the same method as the process for designing a dimple pattern having circular dimples. The central point of each circle 14 is a generating point 16. Generating points 16 may be obtained by a different method. For example, generating points 16 may be randomly arranged on the surface of the phantom sphere 12.

An example of a method for randomly arranging generating points 16 is a method using random numbers. The method includes the steps of:

(1) generating random numbers;
(2) deciding a coordinate on the surface of the phantom sphere 12 based on the random numbers;
(3) calculating a distance between a point having the coordinate and a point that has already been present on the surface of the phantom sphere 12; and
(4) recognizing the point having the coordinate as a generating point 16 when the distance is within a predetermined range.

A point on the surface of the phantom sphere 12 is represented by a spherical coordinate $(\theta, \phi)$. Here, $\theta$ represents a latitude, and $\phi$ represents a longitude. The spherical coordinate $(\theta, \phi)$ can be calculated by the following mathematical formula.

$$(\theta,\phi)=(2\cos^{-1}(1-\xi_x)^{1/2}, 2\Pi\xi_y)$$

In the mathematical formula, $\xi_x$ and $\xi_y$ are random numbers that are real numbers of 0 or greater but 1 or less.

Random numbers $\xi_x$ and $\xi_y$ are sequentially generated, a spherical coordinate $(\theta, \phi)$ is calculated, and a point having the spherical coordinate $(\theta, \phi)$ is arranged on the surface of the phantom sphere 12. At that time, if the arrangement is performed unlimitedly, a zone in which points are concentrated can occur. For the purpose of avoiding occurrence of such a zone, a restriction is placed on arranging the points. Specifically, the distance between the point having the spherical coordinate $(\theta, \phi)$ and a generating point 16 that has already been present on the surface of the phantom sphere 12 and is closest to the point having the spherical coordinate $(\theta, \phi)$ is calculated. When the distance is within a predetermined range, the point having the spherical coordinate $(\theta, \phi)$ is recognized as a generating point 16. When the distance between the point having the spherical coordinate $(\theta, \phi)$ and the point that has already been present on the surface of the phantom sphere 12 is out of the predetermined range, the point having the spherical coordinate $(\theta, \phi)$ is not recognized as a generating point 16. The details of the method for randomly arranging points using random numbers are disclosed in Japanese Patent Application No. 2012-220513.

Another example of the method for randomly arranging generating points 16 is a method using a Cellular Automaton method. The method includes the steps of:

(1) assuming a plurality of states;
(2) assuming a large number of cells on the surface of the phantom sphere 12;
(3) assigning any one of the states to each cell;
(4) assigning, as an attribute of the cell, any one of INSIDE, OUTSIDE, and BOUNDARY to the cell based on the state of the cell and states of a plurality of cells located adjacent to the cell;
(5) assuming a loop by connecting cells of BOUNDARY; and
(6) deciding a generating point 16 based on the loop or another loop obtained based on this loop.

The details of the method for randomly arranging points using the Cellular Automaton method are disclosed in Japanese Patent Application No. 2012-220513.

EXAMPLES

Experiment I

Example I.1

A rubber composition was obtained by kneading 100 parts by weight of a polybutadiene (trade name "BR-730", manufactured by JSR Corporation), 30 parts by weight of zinc diacrylate, 6 parts by weight of zinc oxide, 10 parts by weight of barium sulfate, 0.5 parts by weight of diphenyl disulfide, and 0.5 parts by weight of dicumyl peroxide. This rubber composition was placed into a mold including upper and lower mold halves each having a hemispherical cavity, and heated at 170° C. for 18 minutes to obtain a core with a diameter of 39.7 mm. Meanwhile, a resin composition was obtained by kneading 50 parts by weight of an ionomer resin (trade name "Himilan 1605", manufactured by Du Pont-MITSUI POLYCHEMICALS Co., LTD.), 50 parts by weight of another ionomer resin (trade name "Himilan 1706", manufactured by Du Pont-MITSUI POLYCHEMICALS Co., LTD.), and 3 parts by weight of titanium dioxide. The above core was placed into a final mold having a large number of pimples on its inside face, and the above resin composition was injected around the core by injection molding to form a cover with a thickness of 1.5 mm. A large number of dimples having a shape that is the inverted shape of the pimples were formed on the cover. Spew occurred on the surface of the cover. The spew was removed by cutting with a grindstone. A clear paint including a two-component curing type polyurethane as a base material was applied to this cover to obtain a golf ball with a diameter of 42.7 mm and a weight of about 45.4 g. The golf ball has a PGA compression of about 85. The golf ball has a dimple pattern shown in FIGS. 2 and 3. The occupation ratio of the golf ball is 92%. The details of the dimples are shown in Table I.1 below. It is noted the cutting of the spew was performed under the following conditions A to C.

Condition A: condition that the depth of a dimple is made larger by 0.016 mm than that under the condition B.
Condition B: standard condition
Condition C: condition that the depth of a dimple is made smaller by 0.016 mm than that under the condition B.

Examples I.2 and I.3

Golf balls of Examples I.2 and I.3 were obtained in the same manner as Example I.1, except the final mold was changed. The details of the dimples of the golf balls are shown in Table I.1 below.

Comparative Example I

Figure 14:
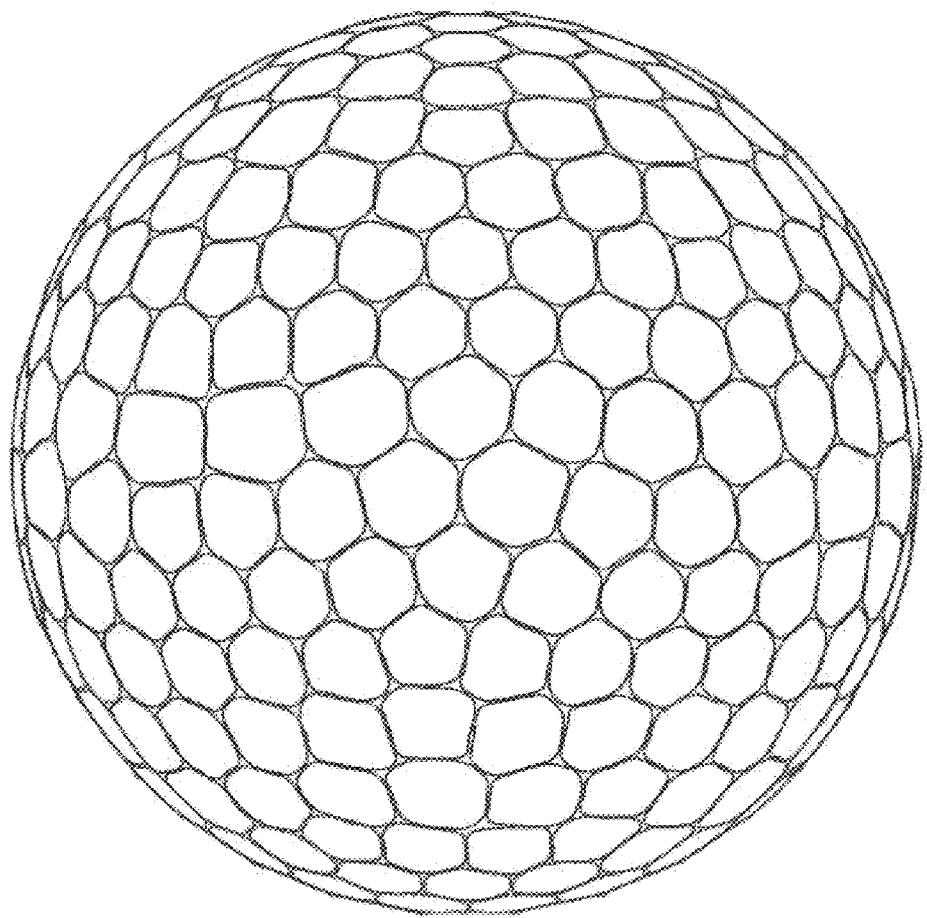
FIG. 14 is a front view of a golf ball according to Comparative Example I.
Figure 15:
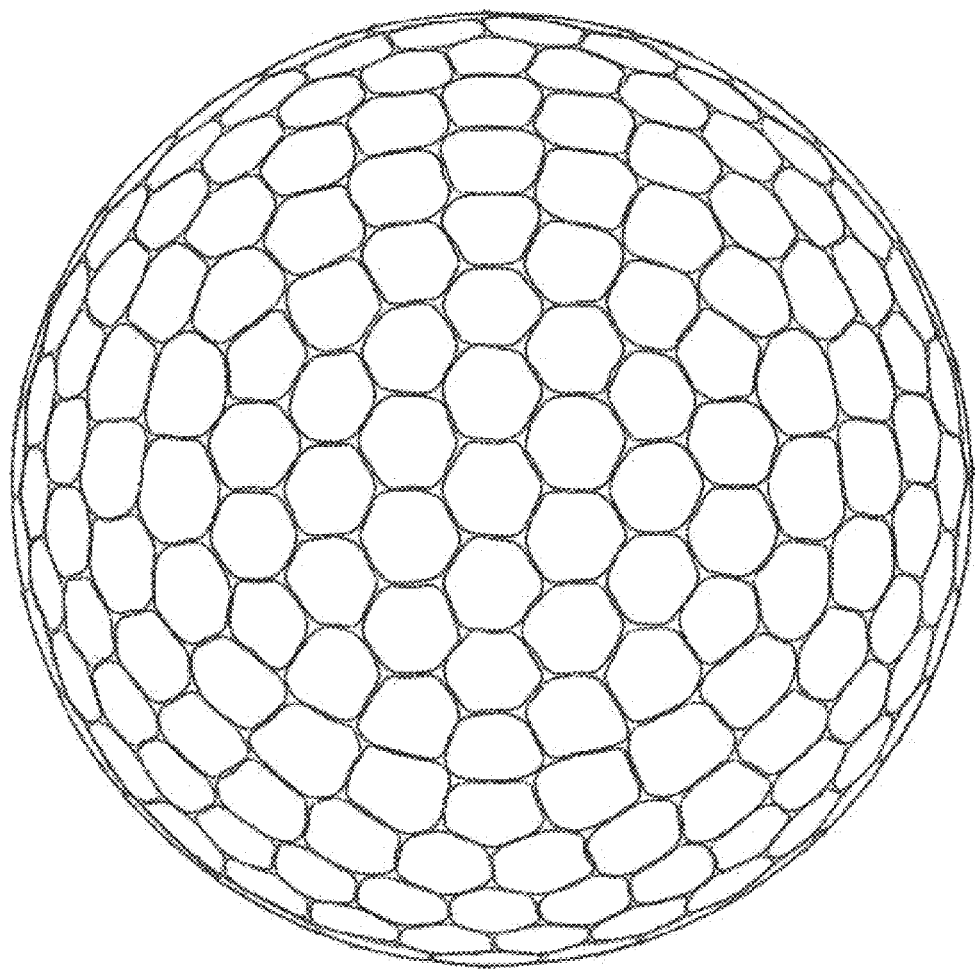
FIG. 15 is a plan view of the golf ball in FIG. 14.

A golf ball of Comparative Example I was obtained in the same manner as Example I.1, except the final mold was changed. The golf ball has 339 dimples. The dimple pattern of the golf ball is shown in FIGS. 14 and 15. The dimple pattern of the golf ball is one in which five dimples are removed from the near-equator zone in the dimple pattern of Example I.1.

The contours of dimples adjacent to the removed dimples are corrected. The occupation ratio of the golf ball is 92%.

Reference Example I

A golf ball of Reference Example I was obtained in the same manner as Example I.1, except the final mold was changed. The golf ball has 344 circular dimples. The pattern of the contours of these circular dimples is shown in FIGS. 4 and 5. The occupation ratio of the golf ball is 82%.

[Test of Aerodynamic Symmetry]

Trajectory calculation was performed by using aerodynamic characteristic values obtained in an ITE test. The conditions of the trajectory calculation are as follows.

Ball speed: 78 m/s (255.6 ft/s)

Launch angle: 9.8°

Backspin rate: 2300 rpm

Differences between PH rotation and POP rotation in flight distance and flight duration obtained through the trajectory calculation are shown in Table I.1 and FIGS. 22 to 26. The flight distance is the distance from the launch point to the landing point. In graphs of FIGS. 22 to 26, the horizontal axis indicates a difference in flight distance (m), and the vertical axis indicates a difference in flight duration (sec). In each graph, results of golf balls in which spew cutting was performed under the conditions A, B, and C are plotted.

TABLE I.1

Results of Evaluation

Figure 18:
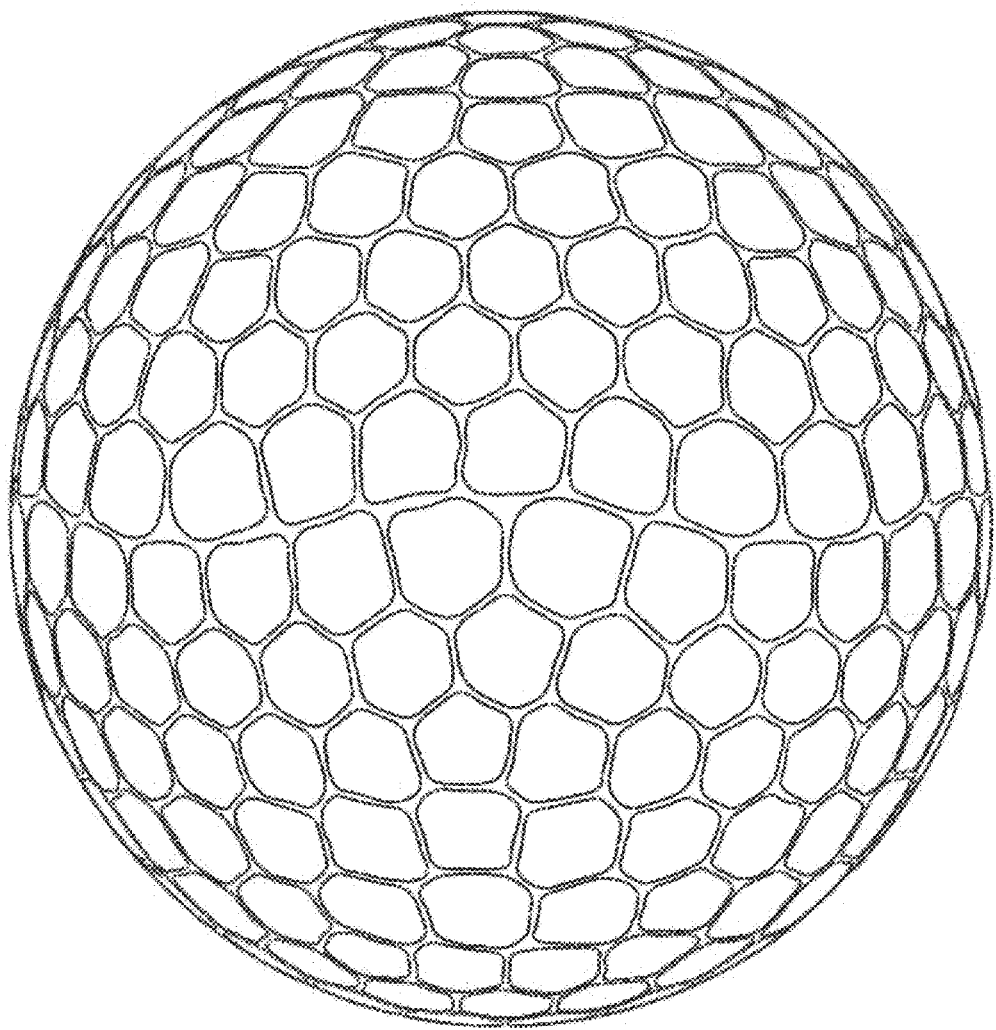
FIG. 18 is a front view of a golf ball according to Example I.2 of the present invention.
Figure 19:
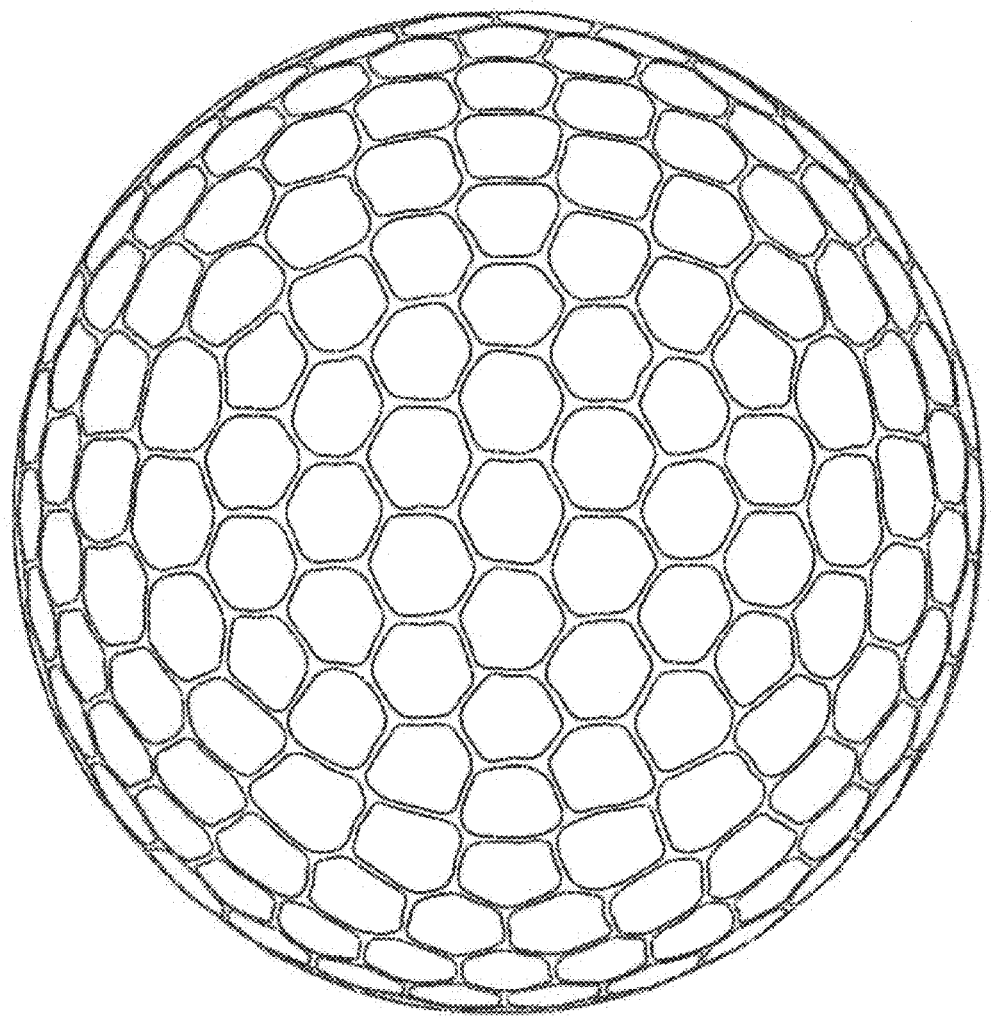
FIG. 19 is a plan view of the golf ball in FIG. 18.
Figure 20:
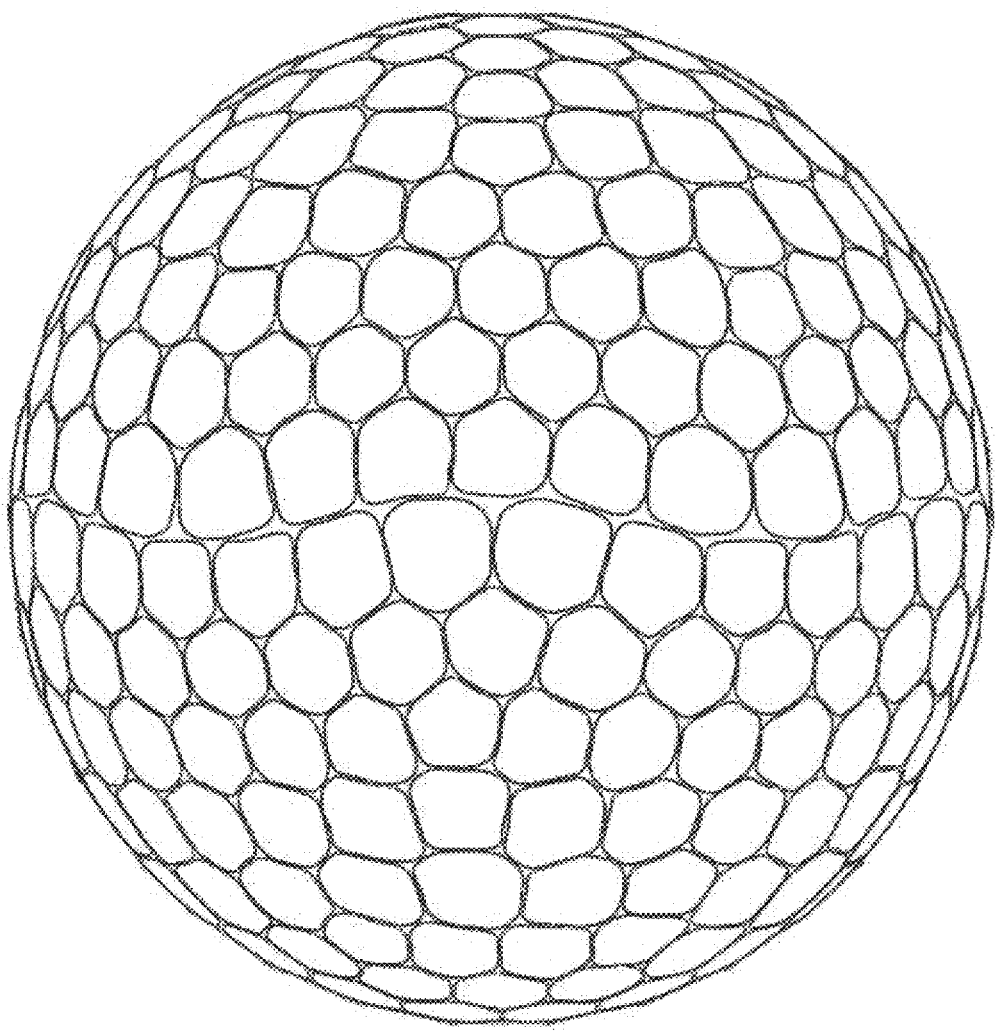
FIG. 20 is a front view of a golf ball according to Example I.3 of the present invention.
Figure 21:
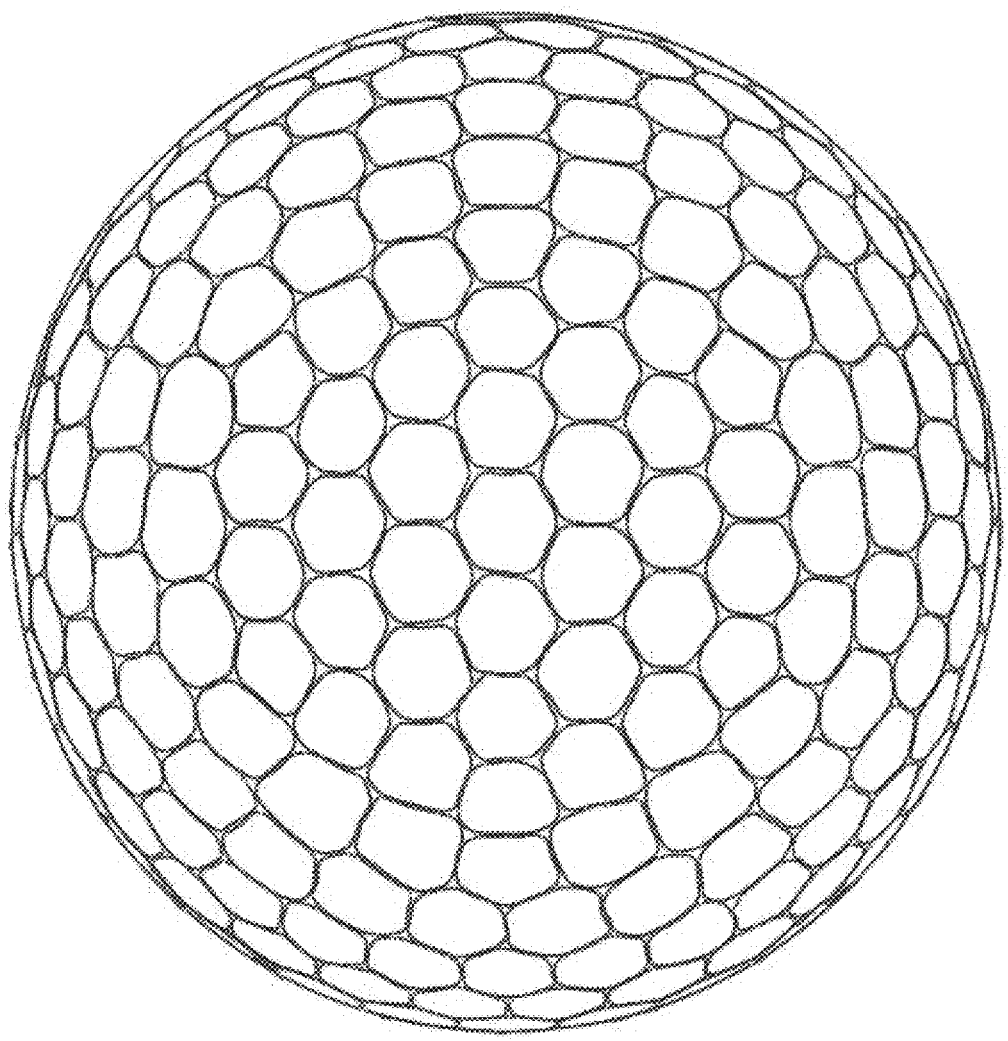
FIG. 21 is a plan view of the golf ball in FIG. 20.
Figure 22:
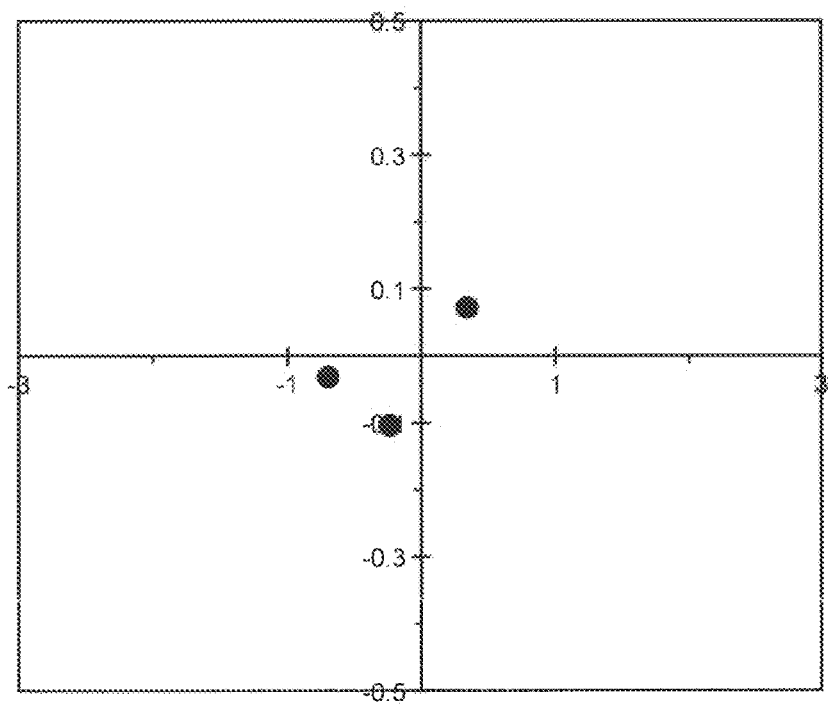
FIG. 22 is a graph showing an evaluation result of a golf ball according to Example I.1 of the present invention.
Figure 23:
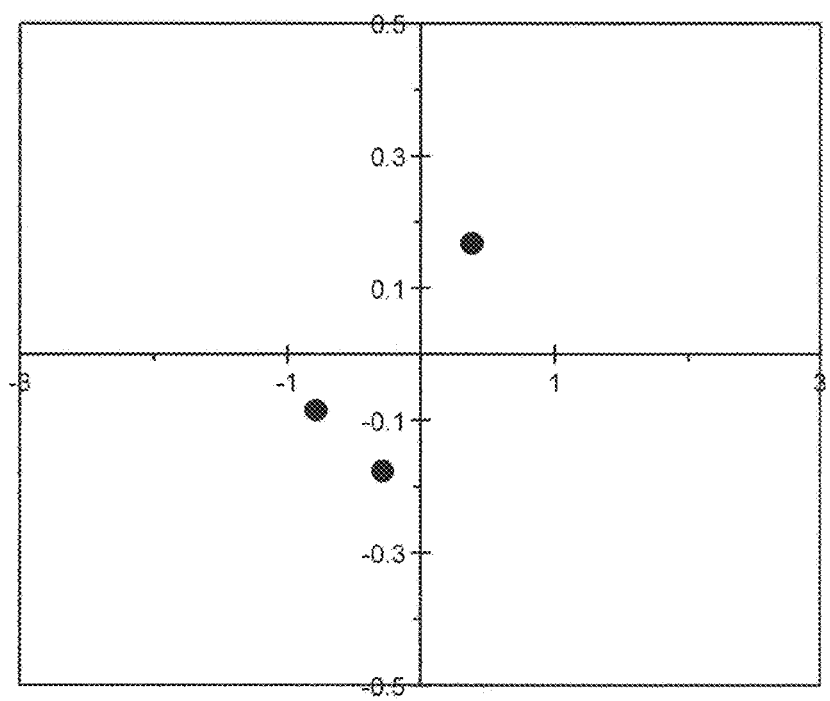
FIG. 23 is a graph showing an evaluation result of the golf ball according to Example I.2 of the present invention.
Figure 24:
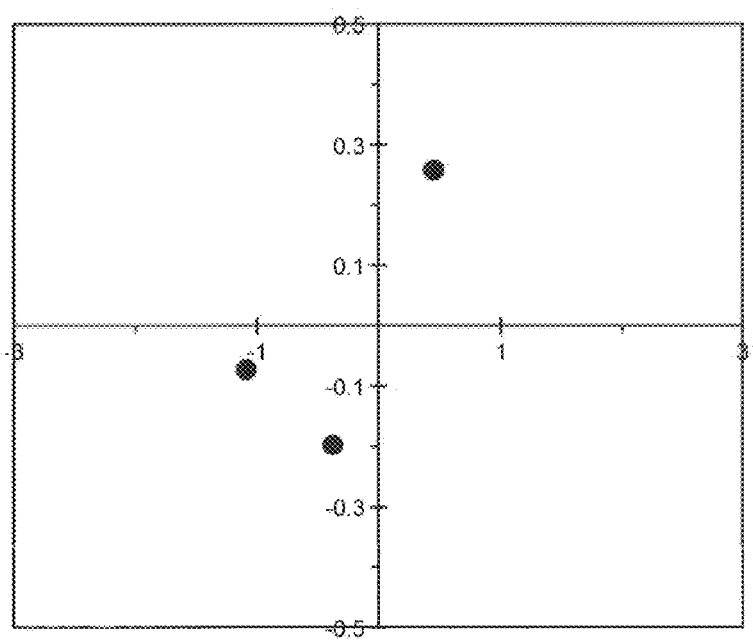
FIG. 24 is a graph showing an evaluation result of the golf ball according to Example I.3 of the present invention.
Figure 25:
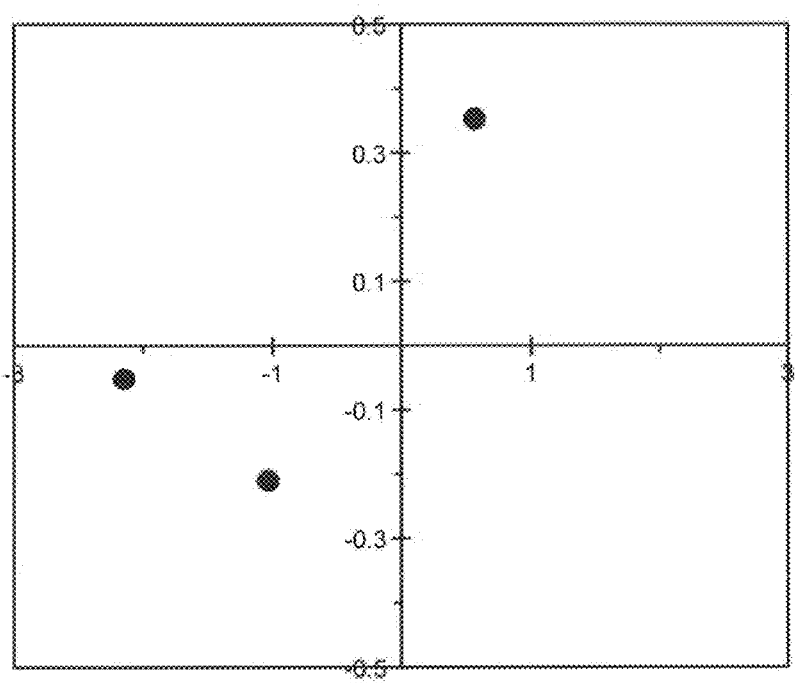
FIG. 25 is a graph showing an evaluation result of the golf ball according to Comparative Example I.
Figure 26:
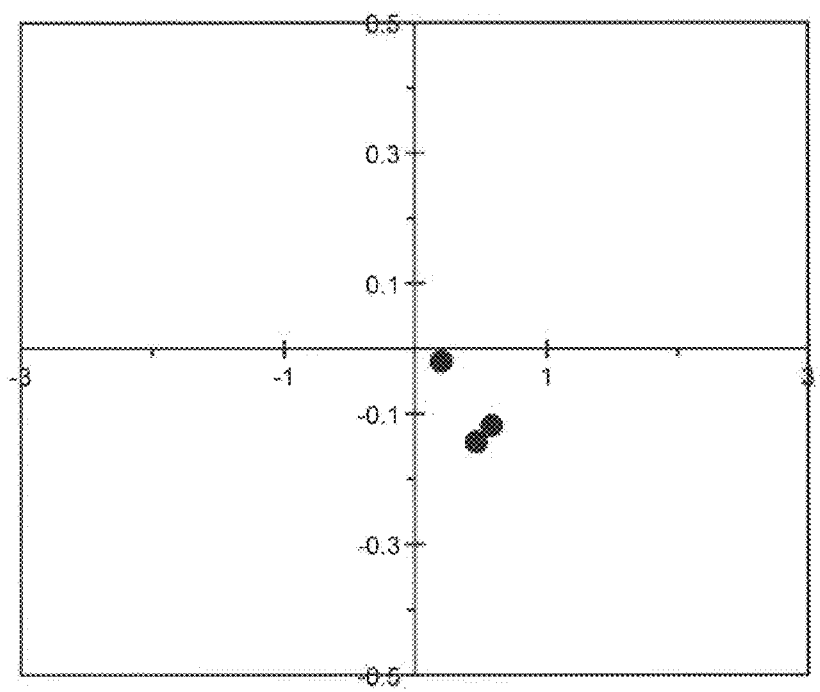
FIG. 26 is a graph showing an evaluation result golf ball according to Reference Example I.

| | Ex. I.2 | Ex. I.1 | Ex. I.3 | Comp. Ex. I | Ref. Ex. I |
|---|---|---|---|---|---|
| Amax (mm³) | 18.39 | 19.49 | 19.72 | 23.01 | 16.62 |
| Aave (mm³) | 14.48 | 15.63 | 15.66 | 18.64 | 14.21 |
| Occupation ratio (%) | 85 | 92 | 92 | 92 | 82 |
| Front view | FIG. 18 | FIG. 2 | FIG. 20 | FIG. 14 | FIG. 4 |
| Plan view | FIG. 19 | FIG. 3 | FIG. 21 | FIG. 15 | FIG. 5 |
| Number of dimples | 344 | 344 | 344 | 339 | 344 |
| Amax difference (mm²) | | | | | |
| Conditions A-B | 0.29 | 0.31 | 0.34 | 0.37 | 0.27 |
| Conditions B-C | 0.29 | 0.31 | 0.34 | 0.37 | 0.27 |
| Conditions A-C | 0.58 | 0.62 | 0.68 | 0.37 | 0.53 |
| Flight distance difference (m) | | | | | |
| Condition A | −0.233 | −0.283 | −0.376 | −1.033 | 0.467 |
| Condition B | −0.695 | −0.783 | −1.087 | −2.150 | 0.583 |
| Condition C | 0.342 | 0.383 | 0.451 | 0.567 | 0.200 |
| Flight duration difference (sec) | | | | | |
| Condition A | −0.104 | −0.177 | −0.198 | −0.210 | −0.143 |
| Condition B | −0.032 | −0.085 | −0.073 | −0.052 | −0.118 |
| Condition C | 0.072 | 0.167 | 0.258 | 0.353 | −0.020 |
| Graph | FIG. 23 | FIG. 22 | FIG. 24 | FIG. 25 | FIG. 26 |

Table I.1 shows the values of Amax, Rave, and the occupation ratios when spew cutting was performed under the standard condition.

As shown in Table I.1 and FIGS. 22 to 26, the golf ball of each Example has small differences between PH rotation and POP rotation as compared to the golf ball of the Comparative Example. In addition, the golf ball of each Example has poor trajectory sensitivity to the spew cutting condition as compared to the golf ball of the Comparative Example. From the results of evaluation, advantages of the present invention are clear.

Experiment II

Example II.1

A rubber composition was obtained by kneading 100 parts by weight of a polybutadiene (trade name "BR-730", manufactured by JSR Corporation), 30 parts by weight of zinc diacrylate, 6 parts by weight of zinc oxide, 10 parts by weight of barium sulfate, 0.5 parts by weight of diphenyl disulfide, and 0.5 parts by weight of dicumyl peroxide. This rubber composition was placed into a mold including upper and lower mold halves each having a hemispherical cavity, and heated at 170° C. for 18 minutes to obtain a core with a diameter of 39.7 mm. Meanwhile, a resin composition was obtained by kneading 50 parts by weight of an ionomer resin (trade name "Himilan 1605", manufactured by Du Pont-MITSUI POLYCHEMICALS Co., LTD.), 50 parts by weight of another ionomer resin (trade name "Himilan 1706", manufactured by Du Pont-MITSUI POLYCHEMICALS Co., LTD.), and 3 parts by weight of titanium dioxide. The above core was placed into a final mold having a large number of pimples on its inside face, and the above resin composition was injected around the core by injection molding to form a cover with a thickness of 1.5 mm. A large number of dimples having a shape that is the inverted shape of the pimples were formed on the cover. A clear paint including a two-component curing type polyurethane as a base material was applied to this cover to obtain a golf ball with a diameter of 42.7 mm and a weight of about 45.4 g. The golf ball has a PGA compression of about 85. The golf ball has a dimple pattern shown in FIGS. 2 and 3. The occupation ratio of the golf ball is 92%. The details of the dimples are shown in Tables II.1 and II.3 below.

Comparative Example II.1

A golf ball of Comparative Example II.1 was obtained in the same manner as Example II.1, except the final mold was changed. The golf ball has 344 circular dimples. The pattern of the contours of these dimples is shown in FIGS. 4 and 5. The occupation ratio of the golf ball is 82%.

Example II.2

Figure 27:
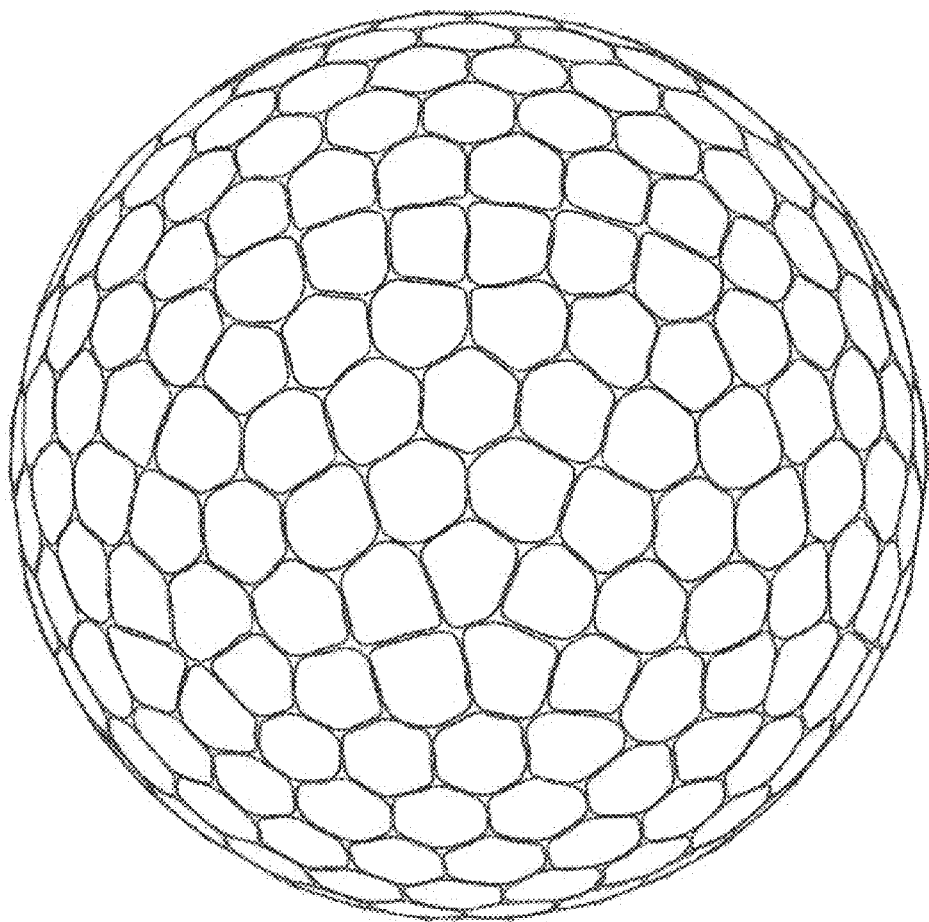
FIG. 27 is a front view of a golf ball according to Example II.2 of the present invention.
Figure 28:
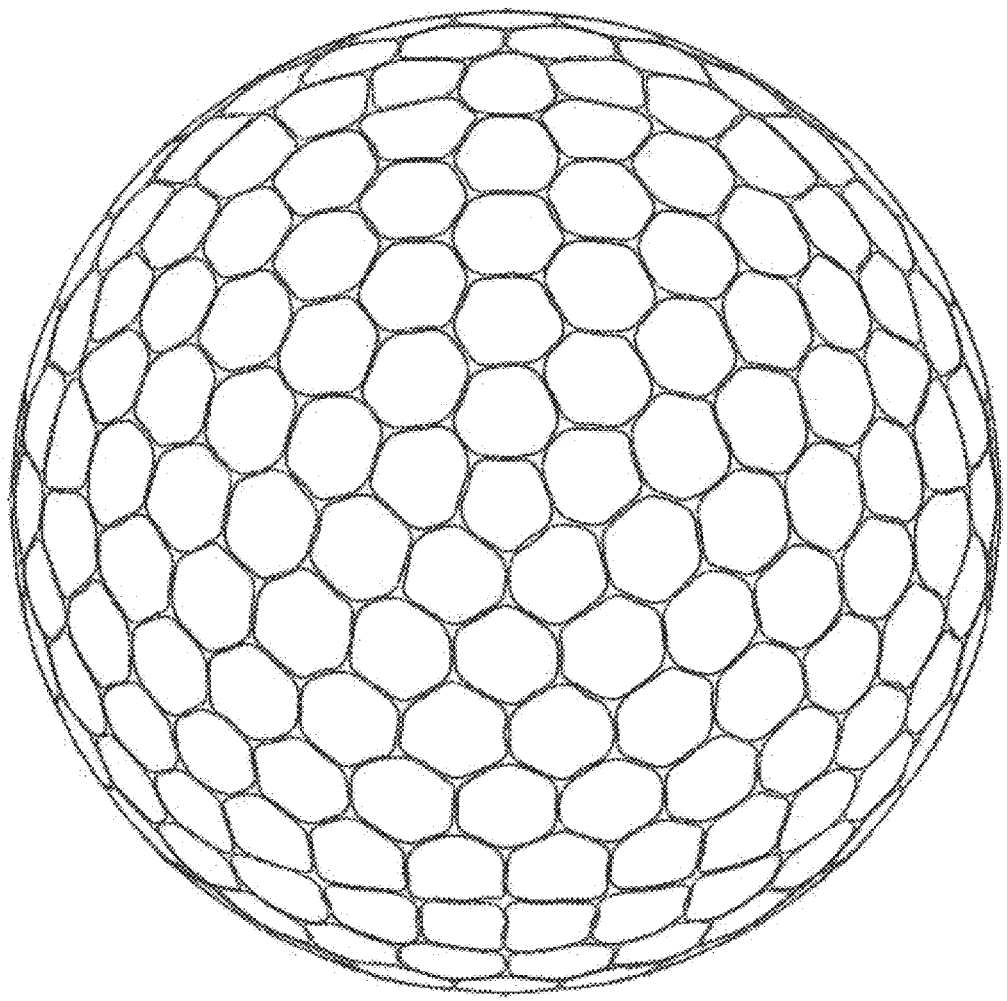
FIG. 28 is a plan view of the golf ball in FIG. 27.

A golf ball of Example II.2 was obtained in the same manner as Example II.1, except the final mold was changed. The golf ball has 324 non-circular dimples. The pattern of the contours of these dimples is shown in FIGS. 27 and 28. The pattern was designed by a Voronoi tessellation. Generating points in this Voronoi tessellation are the centers of circles in a pattern of Comparative Example II.2 described below. The occupation ratio of the golf ball is 92%.

Comparative Example II.21

Figure 29:
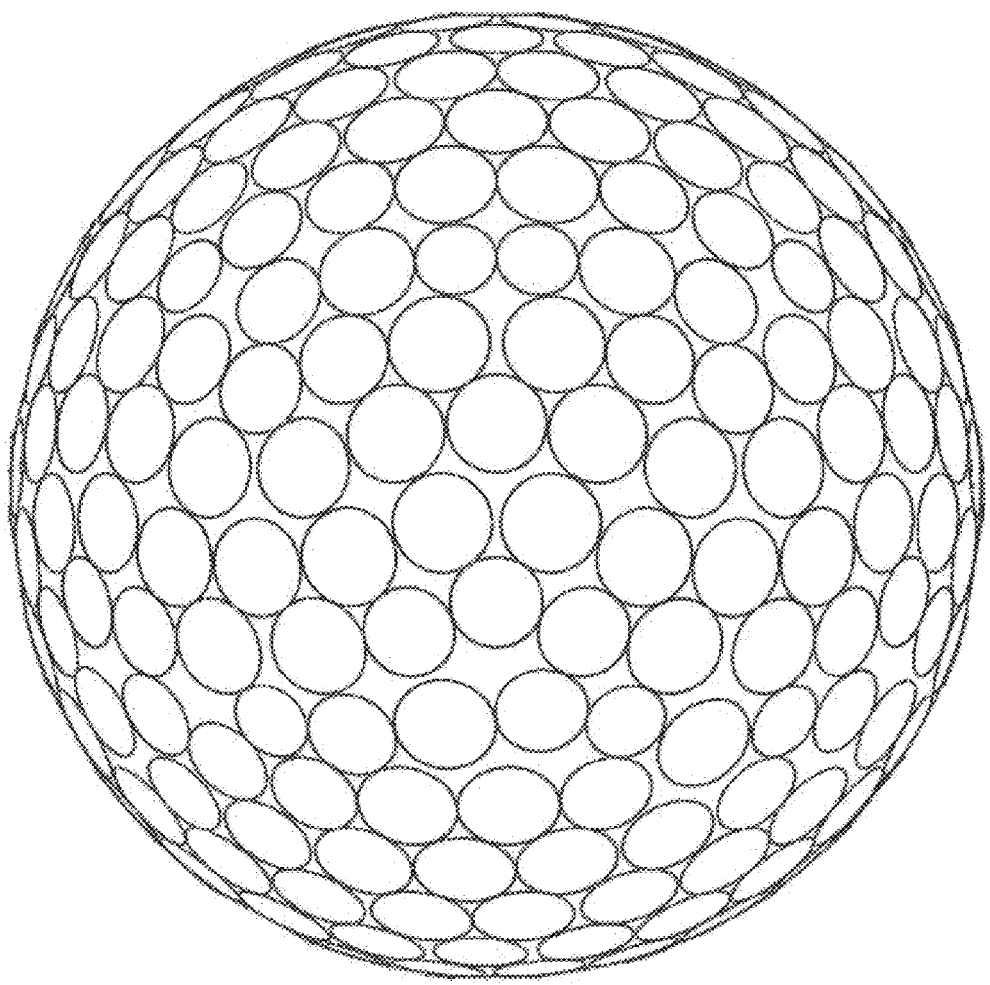
FIG. 29 is a front view of a golf ball according to Comparative Example II.2.
Figure 30:
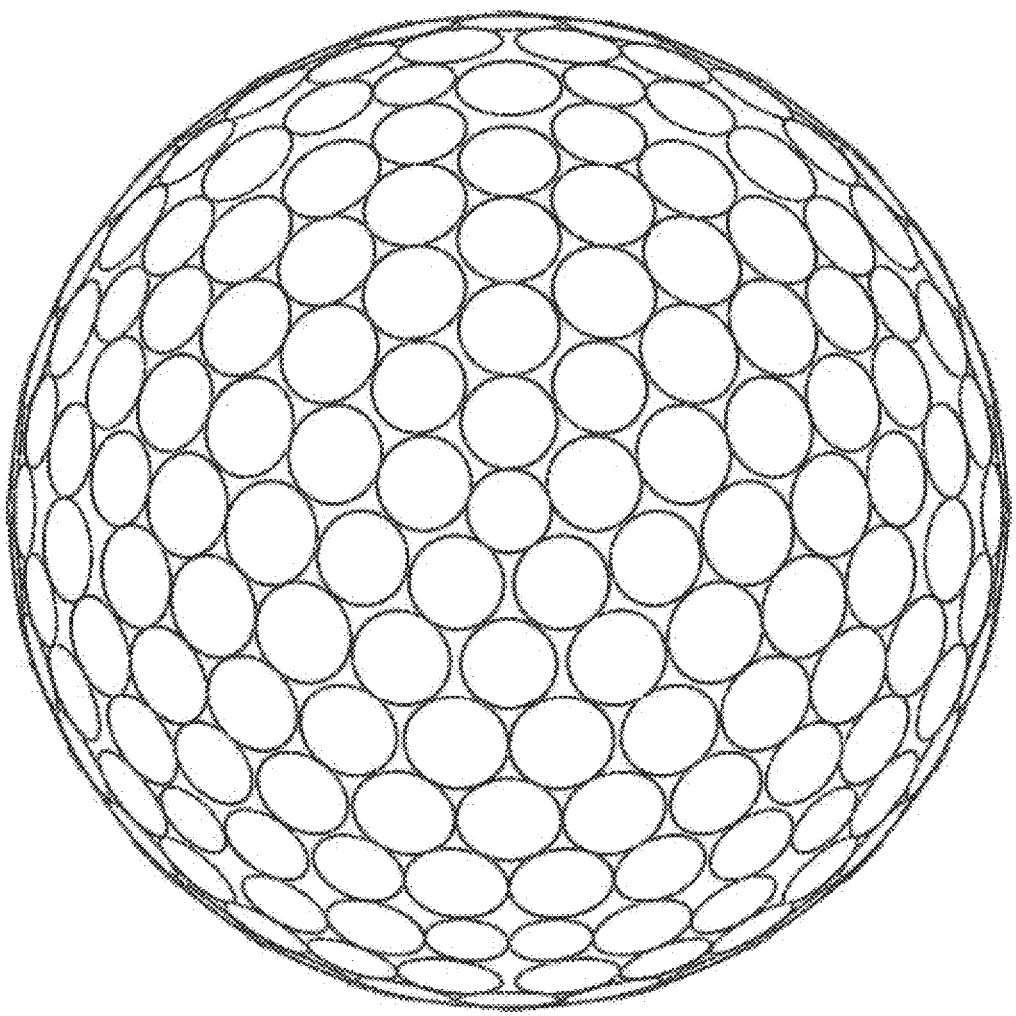
FIG. 30 is a plan view of the golf ball in FIG. 29.

A golf ball of Comparative Example II.2 was obtained in the same manner as Example II.1, except the final mold was changed. The golf ball has 324 circular dimples. The pattern of the contours of these dimples is shown in FIGS. 29 and 30. The occupation ratio of the golf ball is 81%.

Example II.3

Figure 31:
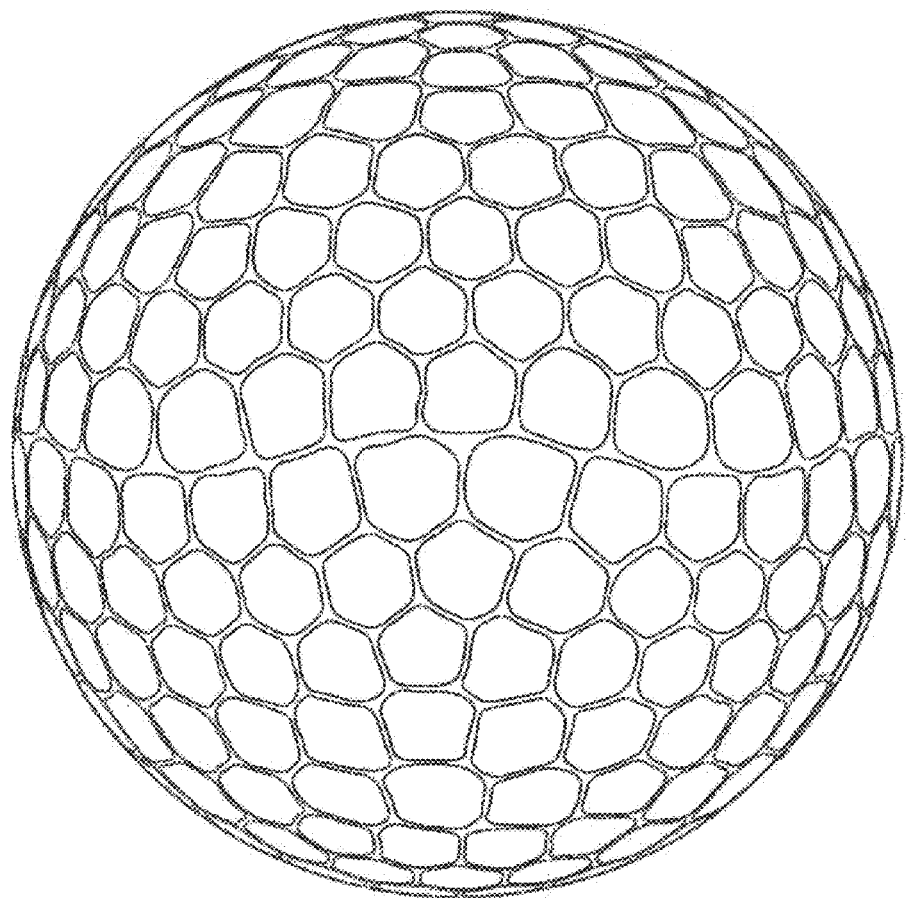
FIG. 31 is a front view of a golf ball according to Example II.3 of the present invention.
Figure 32:
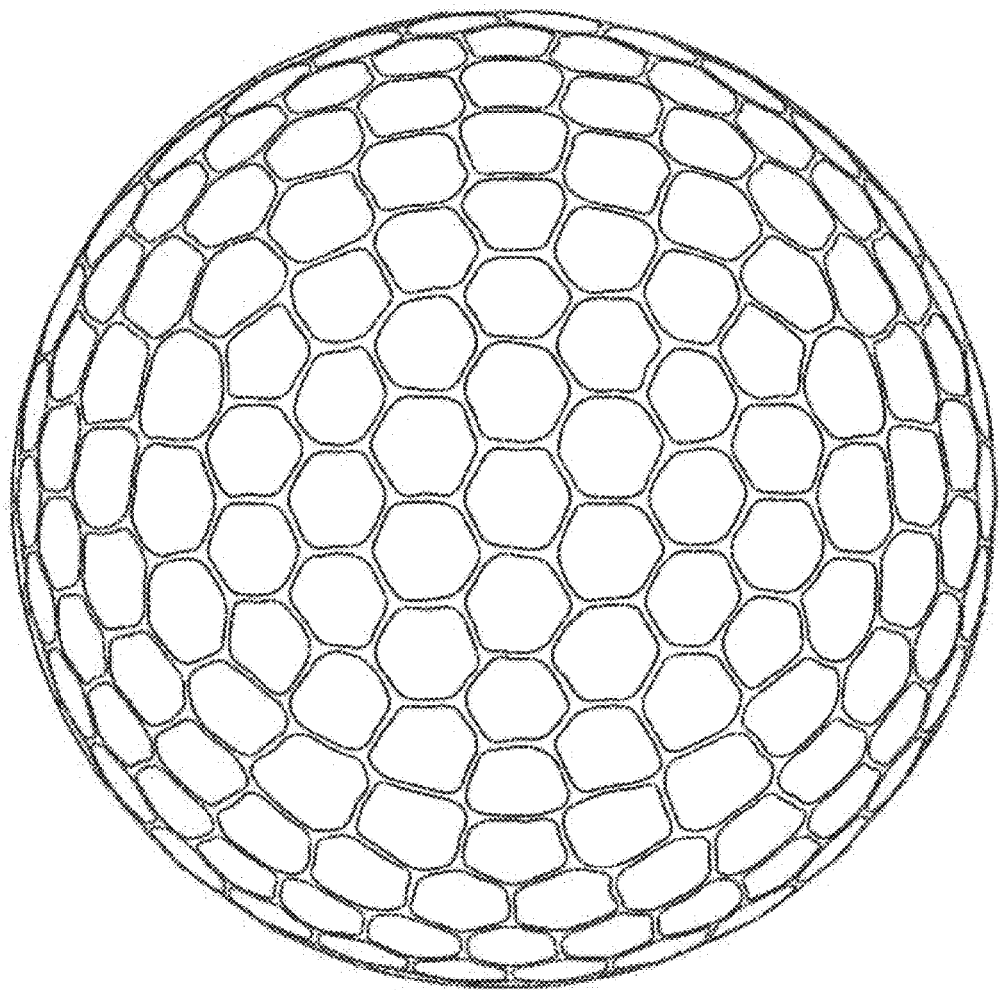
FIG. 32 is a plan view of the golf ball in FIG. 31.

A golf ball of Example II.3 was obtained in the same manner as Example II.1, except the final mold was changed. The golf ball has 344 non-circular dimples. The pattern of the contours of these dimples is shown in FIGS. 31 and 32. The pattern was designed by a Voronoi tessellation. Generating points in this Voronoi tessellation are the centers of circles in a pattern of Comparative Example II.3 described below. The occupation ratio of the golf ball is 85%.

Comparative Example II.3

Figure 33:
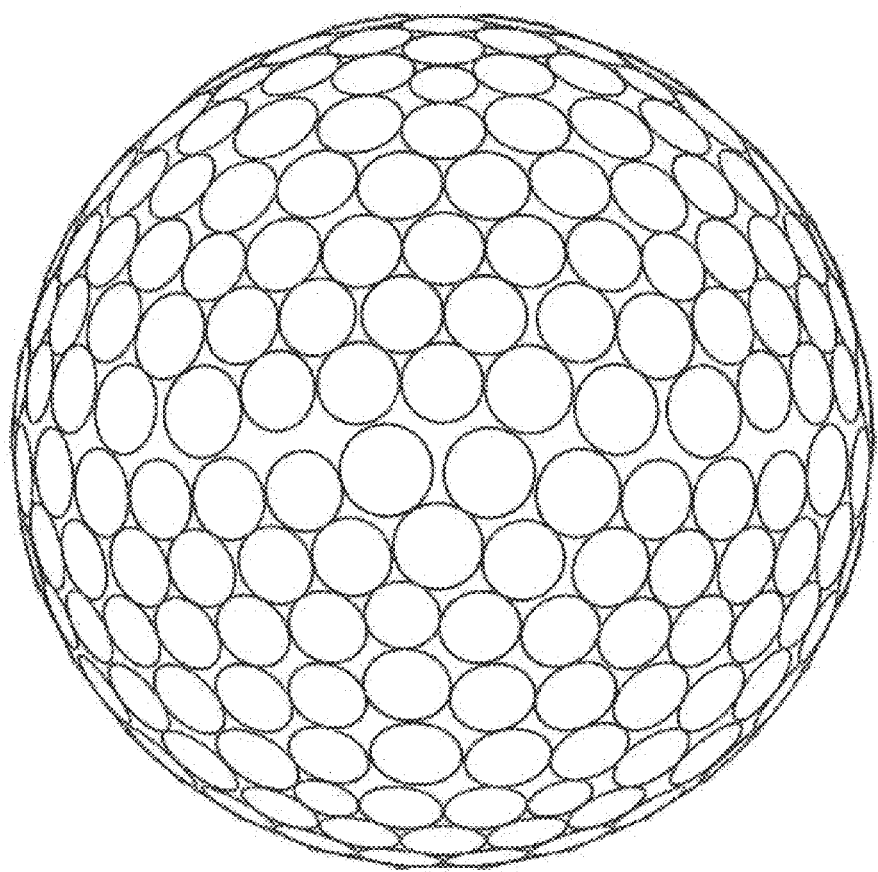
FIG. 33 is a front view of a golf ball according to Comparative Example II.3.
Figure 34:
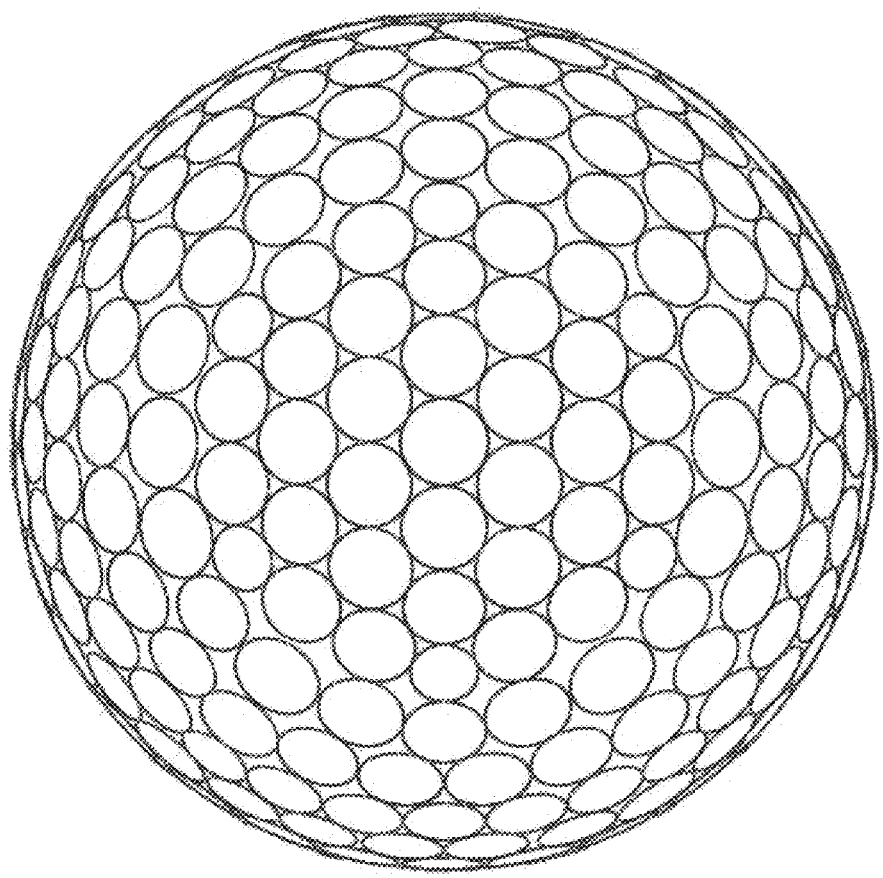
FIG. 34 is a plan view of the golf ball in FIG. 33.

A golf ball of Comparative Example II.3 was obtained in the same manner as Example II.1, except the final mold was changed. The golf ball has 344 circular dimples. The pattern of the contours of these dimples is shown in FIGS. 33 to 34. The occupation ratio of the golf ball is 84%.

Comparative Example II.4

Figure 35:
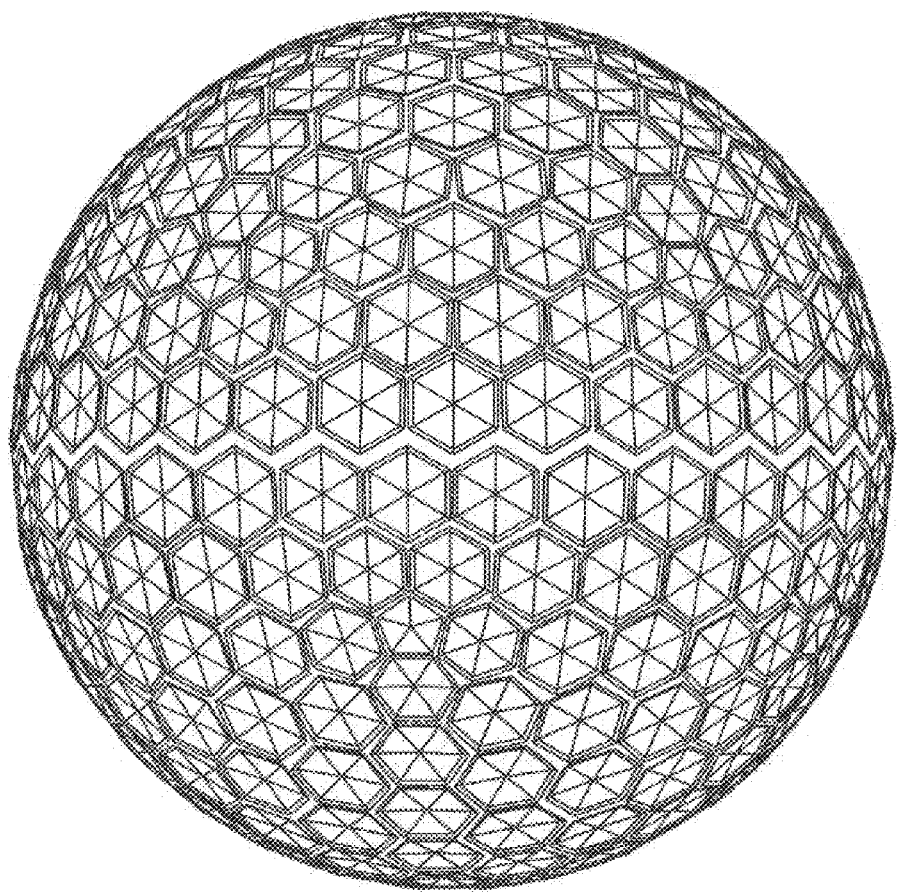
FIG. 35 is a front view of a golf ball according to Comparative Example II.4.
Figure 36:
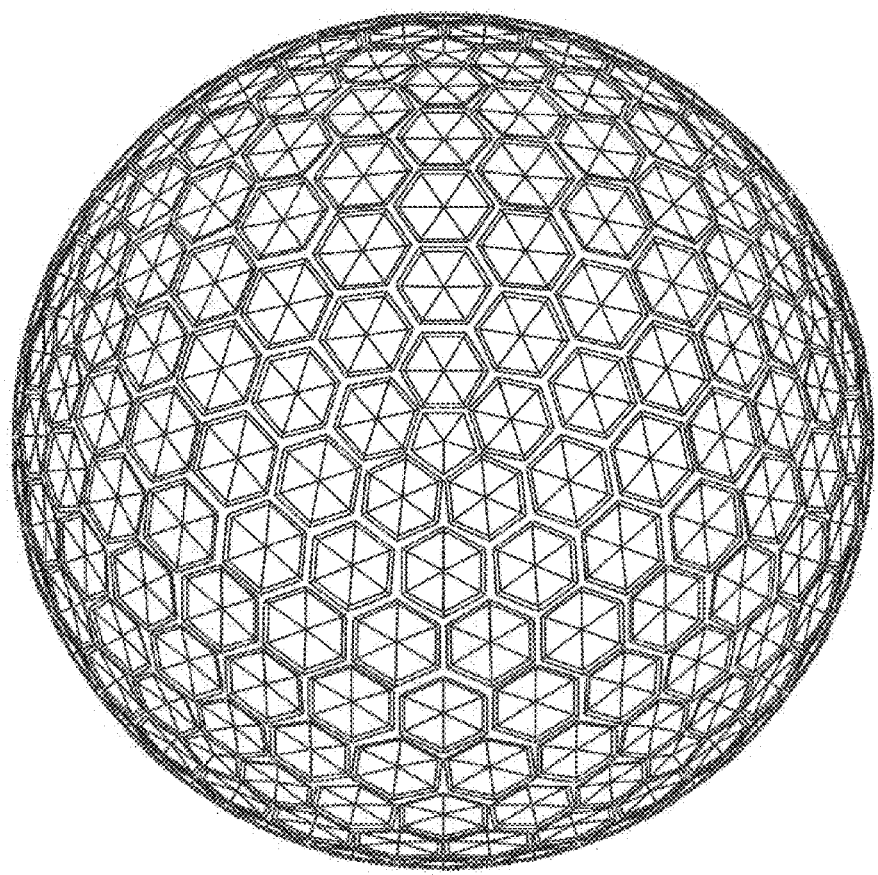
FIG. 36 is a plan view of the golf ball in FIG. 35.
Figure 37:
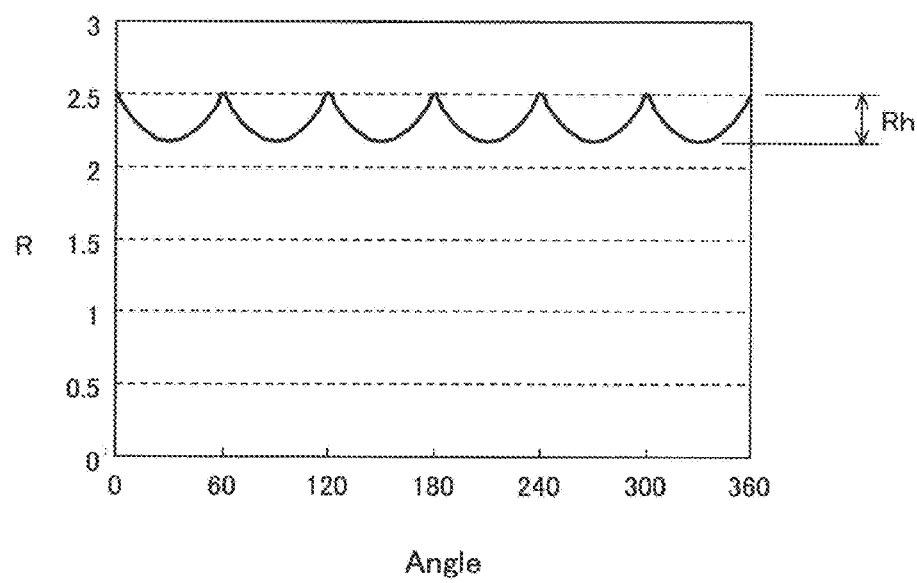
FIG. 37 is a graph for explaining a method for calculating a radius variation range of the golf ball in FIG. 35.
Figure 38:
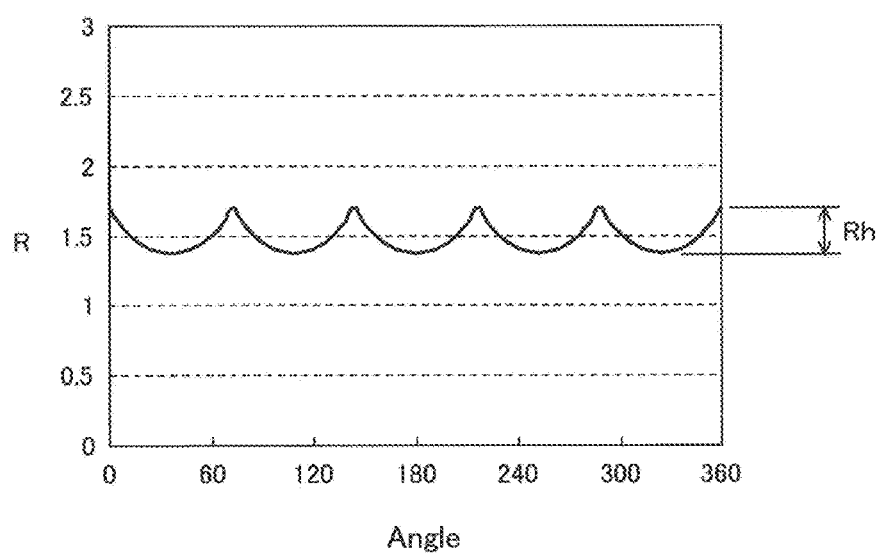
FIG. 38 is a graph for explaining a method for calculating a radius variation range of the golf ball in FIG. 35.

A golf ball of Comparative Example II.4 was obtained in the same manner as Example II.1, except the final mold was changed. The dimple pattern of the golf ball is shown in FIGS. 35 and 36. The golf ball has 320 hexagonal dimples and 12 pentagonal dimples. FIG. 37 shows a graph for calculating a radius variation range Rh of a hexagonal dimple. FIG. 38 shows a graph for calculating a radius variation range Rh of a pentagonal dimple. The occupation ratio of the golf ball is 86%.

[Flight Distance Test]

Trajectory calculation was performed by using aerodynamic characteristic values obtained in an ITR test. The conditions of the trajectory calculation are as follows.

Ball speed: 57 m/s (187.0 ft/s)
Launch angle: 13°
Backspin rate: 2400 rpm

Flight distances obtained through the trajectory calculation are shown in Tables II.1 and II.2 below. Each flight distance is the distance from the launch point to the landing point.

TABLE II.1

Results of Evaluation

|  | Example II.1 | Comp. Example II.1 | Example II.2 | Comp. Example II.2 |
|---|---|---|---|---|
| Rhmax (mm) | 0.916 | 0.000 | 1.256 | 0.000 |
| Rhmin (mm) | 0.228 | 0.000 | 0.259 | 0.000 |
| Rhmax − Rhmin (mm) | 0.688 | 0.000 | 0.997 | 0.000 |
| Standard deviation of Rh (mm) | 0.1321 | 0.0000 | 0.1917 | 0.0000 |
| P1 (%) | 81 | 0 | 88 | 0 |
| P2 (%) | 36 | 0 | 50 | 0 |
| Occupation ratio (%) | 92 | 82 | 92 | 81 |
| Total number of dimples | 344 | 344 | 324 | 324 |
| Flight distance (m) | 197.2 | 196.2 | 198.5 | 196.5 |

TABLE II.2

Results of Evaluation

|  | Example II.3 | Comp. Example II.3 | Comp. Example II.4 |
|---|---|---|---|
| Rhmax (mm) | 0.890 | 0.000 | 0.337 |
| Rhmin (mm) | 0.250 | 0.000 | 0.296 |
| Rhmax − Rhmin (mm) | 0.640 | 0.000 | 0.041 |
| Standard deviation of Rh (mm) | 0.1337 | 0.0000 | 0.0148 |
| P1 (%) | 84 | 0 | 0 |
| P2 (%) | 48 | 0 | 0 |
| Occupation ratio (%) | 85 | 84 | 86 |
| Total number of dimples | 344 | 344 | 332 |
| Flight distance (m) | 197.4 | 196.2 | 196.6 |

TABLE II.3

Details of Dimples

|  | Example II.1 | | Example II.2 | |
|---|---|---|---|---|
|  | Dimple having maximum Rh | Dimple having minimum Rh | Dimple having maximum Rh | Dimple having minimum Rh |
| Rave (mm) | 2.396 (Rave1) | 2.157 (Rave2) | 2.316 (Rave1) | 2.181 (Rave2) |
| Rh (mm) | 0.916 (Rhmax) | 0.228 (Rhmin) | 1.256 (Rhmax) | 0.259 (Rhmin) |
| Rh/Rave | 0.382 | 0.106 | 0.542 | 0.119 |
| Rave1 − Rave2 (mm) | 0.239 | | 0.135 | |
| Rhmax − Rhmin (mm) | 0.688 | | 0.997 | |

TABLE II.4

Details of Dimples

|  | Example II.3 | | Comparative Example II.4 | |
|---|---|---|---|---|
|  | Dimple having maximum Rh | Dimple having minimum Rh | Dimple having maximum Rh | Dimple having minimum Rh |
| Rave (mm) | 2.255 (Rave1) | 2.129 (Rave2) | 2.285 (Rave1) | 1.482 (Rave2) |
| Rh (mm) | 0.890 (Rhmax) | 0.250 (Rhmin) | 0.337 (Rhmax) | 0.296 (Rhmin) |
| Rh/Rave | 0.395 | 0.117 | 0.147 | 0.200 |
| Rave1 − Rave2 (mm) | 0.126 | | 0.803 | |
| Rhmax − Rhmin (mm) | 0.640 | | 0.041 | |

As shown in Tables II.1 and II.2, the golf ball of each Example has excellent flight performance. From the results of evaluation, advantages of the present invention are clear.

The dimple pattern described above is applicable to a one-piece golf ball, a multi-piece golf ball, and a thread-wound golf ball, in addition to a two-piece golf ball. The above descriptions are merely illustrative examples, and various modifications can be made without departing from the principles of the present invention.

What is claimed is:

1. A process for designing a rugged pattern on a golf ball surface, the process comprising the steps of:
    (1) creating a phantom sphere corresponding to the golf ball surface of a golf ball;
    (2) assuming a large number of circles on a surface of the phantom sphere;

(3) assuming a large number of generating points based on positions of the large number of circles;

(4) assuming a large number of Voronoi regions on the surface of the phantom sphere by a Voronoi tessellation based on the large number of generating points; and (5) assigning a dimple and a land to the surface of the phantom sphere based on contours of the large number of Voronoi regions; and (6) making a rugged pattern including dimples and lands on the golf ball surface based on the assigned dimple and land on the surface of the phantom sphere, wherein, at the step (2), a large number of circles whose diameters are equal to or greater than 2.0 mm but equal to or less than 6.0 mm are assumed.

2. The process according to claim 1, wherein, at the step (2), the large number of circles are assumed such that each circle does not intersect another circle adjacent to the circle.

3. The process according to claim 1, wherein a number of the circles assumed at the step (2) is equal to or greater than 280 but equal to or less than 400.

4. The process according to claim 1, wherein a ratio of a total area of the circles assumed at the step (2) relative to an area of the surface of the phantom sphere is equal to or greater than 60%.

5. The process according to claim 1, wherein, at the step (3), a center of each circle is assumed as a generating point.

6. The process according to claim 1, wherein, at the step (3), a point obtained by projecting a center of each circle onto the surface of the phantom sphere is assumed as a generating point.

7. The process according to claim 1, wherein the step (4) comprises the steps of:
  (4.1) assuming a large number of minute cells on the surface of the phantom sphere;
  (4.2) selecting a generating point that is closest to each cell;
  (4.3) assuming, for each generating point, a set of cells for which said each generating point is a closest generating point; and
  (4.4) setting each set as a Voronoi region.

8. The process according to claim 1, wherein, at the step (5), the land is assigned to a vicinity of the contour of each Voronoi region of the surface of the phantom sphere.

* * * * *